United States Patent
Carroll

(10) Patent No.: US 11,618,474 B2
(45) Date of Patent: Apr. 4, 2023

(54) AUTONOMOUS ELECTRONIC VEHICLE (AV) INERTIA REDUCTION AND SAFEST PATH DIRECTION SYSTEM

(71) Applicant: David W. Carroll, Grantsburg, WI (US)

(72) Inventor: David W. Carroll, Grantsburg, WI (US)

(*) Notice: Subject to any disclaimer, the term of this patent is extended or adjusted under 35 U.S.C. 154(b) by 187 days.

(21) Appl. No.: 17/067,969

(22) Filed: Oct. 12, 2020

(65) Prior Publication Data
US 2022/0111866 A1    Apr. 14, 2022

(51) Int. Cl.
| | | |
|---|---|---|
| *B60W 60/00* | (2020.01) | |
| *B60W 30/095* | (2012.01) | |
| *B62D 27/06* | (2006.01) | |
| *H04W 4/40* | (2018.01) | |
| *B60W 30/09* | (2012.01) | |
| *B60W 30/08* | (2012.01) | |

(52) U.S. Cl.
CPC ........ *B60W 60/0011* (2020.02); *B60W 30/09* (2013.01); *B60W 30/0956* (2013.01); *B60W 60/0016* (2020.02); *B62D 27/06* (2013.01); *H04W 4/40* (2018.02); *B60W 2030/082* (2013.01)

(58) Field of Classification Search
None
See application file for complete search history.

(56) References Cited

U.S. PATENT DOCUMENTS

| | | | | |
|---|---|---|---|---|
| 5,738,378 A | * | 4/1998 | Yazejian | B62D 39/00 180/232 |
| 8,892,304 B2 | * | 11/2014 | Lu | B60G 17/0165 701/37 |

(Continued)

FOREIGN PATENT DOCUMENTS

| | | |
|---|---|---|
| CN | 207060251 U | 3/2018 |
| CN | 111422156 A | 7/2020 |
| JP | 2002310680 A | 10/2002 |

OTHER PUBLICATIONS

Ichiro Chiku "Vehicle Safety Device (English)", Oct. 5, 2011, English machine translation of JP 4784535 B2 (Year: 2011).*

(Continued)

*Primary Examiner* — James J Lee
*Assistant Examiner* — Steven Vu Nguyen
(74) *Attorney, Agent, or Firm* — Dicke, Billig & Czaja, PLLC

(57) ABSTRACT

A safety system for an autonomous electronic vehicle having a body and a platform. The safety system includes at least one mechanical connection unit and a safety control module. The mechanical connection unit connects the body to the platform, and is transitionable between a first state, in which the body is attached to the platform at the mechanical connection unit, and a second state, in which the body is released from the platform at the mechanical connection unit. The safety control module is programmed to prompt the mechanical connection unit to transition from the first state to the second state under circumstances of an imminent collision event. In some embodiments, the safety control module is programmed to determine a safety path for passengers within the body and/or others in the collision zone based on conditions surrounding the vehicle.

19 Claims, 18 Drawing Sheets

(56) References Cited

U.S. PATENT DOCUMENTS

| | | |
|---|---|---|
| 9,517,686 B1 | 12/2016 | Paramasivam et al. |
| 10,093,183 B2 | 10/2018 | Murata |
| 10,370,035 B2 | 8/2019 | Fees et al. |
| 10,611,412 B1* | 4/2020 | Attia ..................... B62D 21/15 |
| 2007/0035148 A1* | 2/2007 | Ellenrieder ............ B62D 21/15 |
| | | 296/35.1 |
| 2008/0147277 A1 | 6/2008 | Lu et al. |
| 2014/0367930 A1 | 12/2014 | Zeweke et al. |
| 2015/0133041 A1 | 5/2015 | Kiya |
| 2016/0176322 A1 | 6/2016 | Frommann et al. |
| 2017/0225724 A1* | 8/2017 | Andersen ................. F16J 15/10 |
| 2018/0001854 A1* | 1/2018 | Yang ...................... B60R 21/02 |
| 2019/0263265 A1 | 8/2019 | Ferenczi et al. |
| 2020/0062146 A1 | 2/2020 | Freienstein et al. |
| 2020/0148050 A1 | 5/2020 | Lian et al. |
| 2021/0370921 A1* | 12/2021 | Silva ................ B60W 60/0027 |

OTHER PUBLICATIONS

"Lowering Suspension: Pros and Cons" May 2020, Lesschwab.com (Year: 2020).*

PCT Search Report and Written Opinion for Int'l Application No. PCT/US2021/054558 dated Feb. 4, 2022 (9 pages).

* cited by examiner

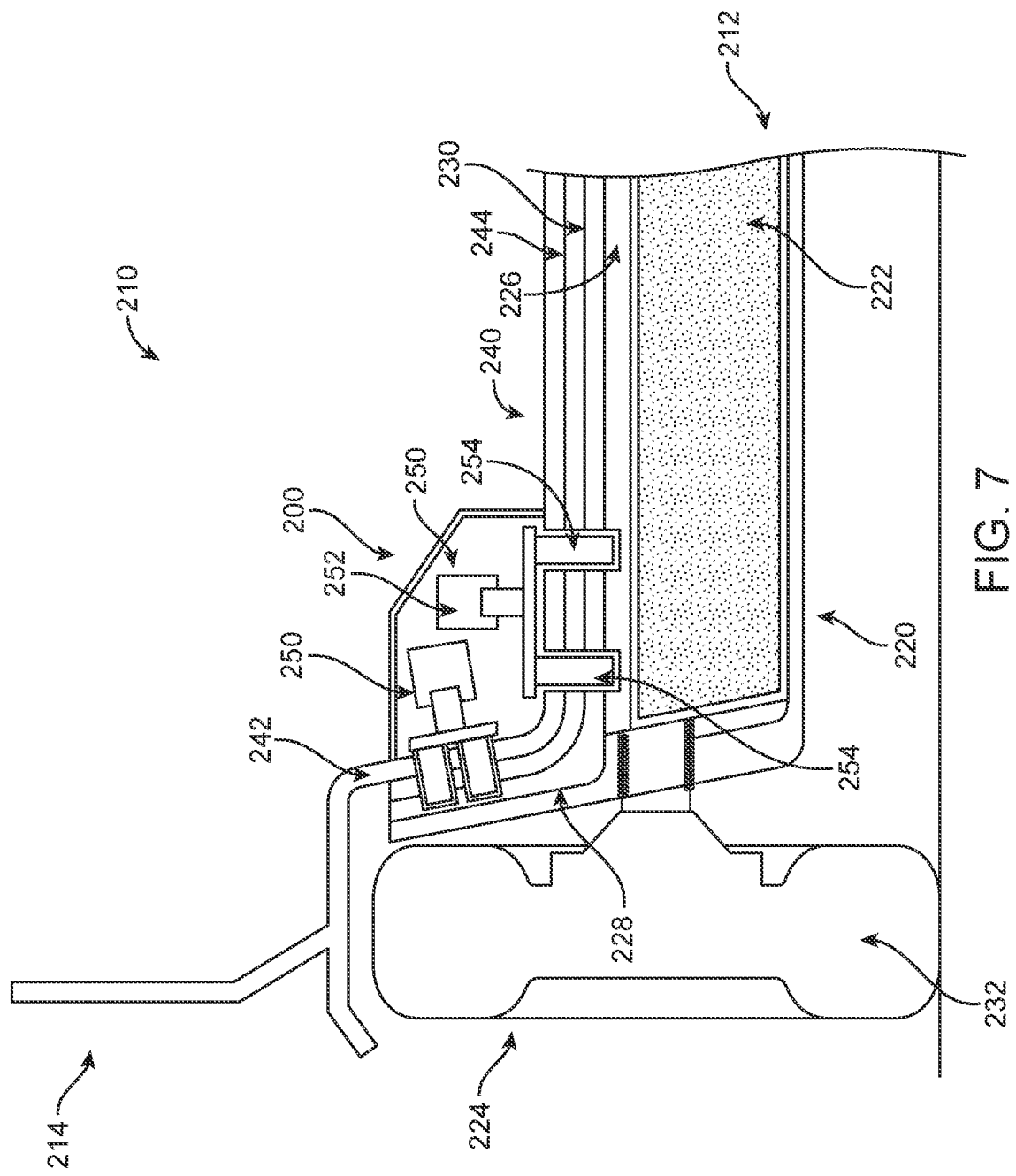

AUTONOMOUS ELECTRONIC VEHICLE (AV) INERTIA REDUCTION AND SAFEST PATH DIRECTION SYSTEM

BACKGROUND

The present disclosure is directed to autonomous electronic vehicles. More particularly, it relates to safety systems and methods for implementation with autonomous electronic vehicles.

Autonomous electronic vehicles (AVs) are being broadly tested and implemented in phases. Many if not most major vehicle manufacturers are working on this for coming products. They are showing success in this effort. It is therefore likely this change to autonomous will become the majority type of transportation over the coming years.

These AV systems use advanced computing, sensors and electronic drive vehicle components and structures to accomplish this new autonomy. They have begun to make them in volume and include various user applications.

New tactics, methods, operational measures are now possible with these new designs and traffic systems for improving the safety of the passenger. They lag behind in the purpose of getting from point A to B without collision. Sometimes, collisions are unavoidable even with the best of autonomous driving. Black ice on a bridge, a young bike rider's sudden loss of control, a blind person crossing the street, a tire blow out, a loss of load on the highway, a deer crossing over many lanes of traffic at high speed, abrupt weather changes to road surfaces and more can cause these unavoidable collision conditions.

SUMMARY

The inventor of the present disclosure has recognized a need to address one or more of the above-mentioned problems. The AV safety systems and methods of the present disclosure provide further ways to avoid a sudden and most dangerous impact from a collision upon the passengers. In some embodiments, the systems and methods of the present disclosure add more data input, more calculation to find that better outcome and provide improved physical means to enact those determined ways to accomplish improved safety outcomes.

Turning wheels, increasing or decreasing throttle, and applying brakes are normal controls and are used to avoid or limit impacts. The result is to eliminate or to lower injury conditions for occupants. To do this well is to implement the systems and methods of the present disclosure by which a preferred and safe action is determined by reviewing/analysis of available data (in some embodiments expanded or broadened data) so the use of these controls will provide the safest outcome. For example, an AV of the present disclosure can include a platform, a body, and a safety system. The platform and body can be akin to conventional autonomous EV designs, with the body configured to house passengers, cargo, etc., and the platform providing wheels, power, etc. The safety system includes a release sub-system and a control sub-system. The release sub-system includes various components, devices, and/or mechanisms that connect the body to the platform. The control sub-system includes a safety control module programmed to determine one or more actions when an imminent or unavoidable collision event occurs. Programming of the safety control module can be saved by/acted upon an existing autonomous controller, or provided with a separate controller carried by the AV. Actions by the safety control module can include prompting operation of the release sub-system to disconnect the body from the platform, either partially or entirely.

In some scenarios, the safety control module may determine that the safest action is to release only some of the connections provided by the release sub-system. In other scenarios, the safety control module may determine that the safest path is make certain action in the common controls in concert with other AV's in the surrounding area. In some scenarios, the safety control module may determine that the safest action is to "aim" the AV in a specific direction, speed up, and then separate the body from the platform. By way of non-limiting example, a safety plan generated by the safety control module may implement an option where the body glances off of the impact threat, avoids oncoming traffic, goes between two trees, and then past a building to come to rest in an open adjoining field. In some embodiments, the safety control module has access to and considers AV autonomous input and other data typical to Google satellite maps or other online available image data to determine the safest action to make more informed decision. Regardless, the end result is a better outcome for passengers of the body based on surrounding conditions, the safety of others and coordination with others to move through an ever-changing impact zone of influence.

It is anticipated that AVs will eventually be the dominate means of transportation. Even though AVs will improve safety over human driving and will be well controlled, not all conditions to avoid collision can be accounted for. Such issues like storm-caused road obstructions, black ice on bridges, deer crossings, biker action irregularities, or a blown tire are but a few examples. Unavoidable collisions will remain an issue. Current AV software and designs are incapable of providing the best safety solution. The safety systems of the present disclosure overcome these deficiencies by providing for the possible separation of AV body from AV platform as dictated by an analysis of available data. Additional data for the analysis can optionally be gleaned from images and wider spread sensor input. This, in combination with optional related situational analysis of how to best reduce inertia by rubbing, bouncing and smaller collision impacting of the body will improve the outcome of these unavoidable collision situations.

With the safety systems of the present disclosure, a release sub-system and a control sub-system are provided. The release sub-system includes one or more mechanical connection units connecting the AV body to the AV platform. The control sub-system includes a safety control module, and optionally one or more sensors (in addition to the sensors conventionally provided with an autonomous EV). The safety control module can represent programming integrated into existing safety-related controllers. In the event of an imminent or unavoidable collision, the safety control module can evaluate available information and decide upon a best course of action, including the possibility of releasing the body from the platform in a manner appropriate to send the detached body along a determined safety path. In some embodiments, the safety determination is preplanned and ready for enactment as soon as the unavoidable collision has been determined so time to decide how to act is nested. In some embodiments, the momentum of the body after mechanical connection unit release(s) provides an intended direction along a singular path line or multiple path lines caused by predetermined smaller impact or surfaces. In some embodiments, the safety control module is able or programmed to predetermine and effect a safe solution using mechanical connection unit release controls, AV motor speed or regeneration or direction, brakes, steering, proximity of the tire to the body, and timing coordination of these controls in combination with wireless communication with other AVs in the area and the safety controls provided with these AVs to provide a safer outcome for the passengers of the AV encountering an imminent collision and others in the impact zone of influence. In one example of safety path control, electrical wires or other extendable and optionally breakable or unbreakable lines between the body and the platform are used to limit or delay the safe path speed, direction or distance.

In some embodiments, the safety systems of the present disclosure employ sensors currently used with common AV designs and intended for partial or fully autonomous driving. In other embodiments, one or more sensors are placed on the highest part of the AV, or on extensions above the body, to gather additional situation input useful to determine a safest path or safer outcome. In yet other embodiments, online available mapping images from such sources as Google and Apple will be used to interpret fixed obstruction determinations. This can include type, size and location of obstructions or, conversely, for path openings to find the safest path for the separated body with passengers. In yet other embodiments, sensor data from previous trips and/or from other AV sensors confirm or provide new data for use in determining safety paths.

In some embodiments, the safety systems of the present disclosure control or utilize motor(s) of the AV to better effect sending of the released passenger body in predetermined direction (e.g., the AV motor(s) can be prompted using reverse polarity). In related embodiments, an adaptation of the reverse polarity option provides positive and directed selected motion to a body separated from the platform for the selected safety escape. It can provide a forward or rearward direction and do so at the speed needed to meet the selected safety plan. For example, in some embodiments, the safety system operates a body-to-platform mechanism that lowers the body a distance sufficient to effect contact between the body and wheel(s) of the AV; frictional interaction between the so-located body and the wheel(s) promotes the wheel(s) placing a force onto the body, sending the body in a predetermined safety path or direction at a desired time.

In some embodiments, the safety system uses prior sensor findings, area images and other historical data to predetermine fixed obstructions in the zone of influence (ZOI) and eliminates those as safety path options before this vehicle proceeds on the trip. It does this for an unreleased AV body and does this for a released body from the platform. Both are compared to find the safest safety path and AV condition. The safety system uses the remaining safety path options from the above analysis to make faster and better decisions just in time as safety is in jeopardy. It uses only those directions and distances that are considered safe from fixed obstructions first so that consideration time is nested. Pre-planning is done to improve outcomes in case of a determination of an upcoming unavoidable collision. The pre-calculations may include assumed speeds of oncoming traffic and thus only make corrections based on sensed changes and new moving objects.

In some embodiments, in the case of an unavoidable collision with a fixed object, such as in the case of the vehicle losing traction on an icy day, the safety system considers the impact on the safety of the passengers by releasing the body from the platform using changed steering angle, reduced speed by braking, changing of motor direction or body to wheel contact after release. It would use type of obstruction such as bush vs. tree, to either release the body from the platform or to retain the body with the platform.

In some embodiments, in the case of an unavoidable collision with a moving object, such as an oncoming vehicle, the vehicle monitors all moving objects for direction and speed and is ready to perform avoidance control measures and as needed activate the safety separation system to achieve the safest remaining path.

In some embodiments, as moving objects come and go from the ZOI and they reduce safety path options from the already eliminated fixed object preplanning, the decision to release or not to release the body is performed based use of standard vehicle controls and changes to remaining time and distance criteria to effect the selected safety path.

In some embodiments, as moving objects in the ZOI eliminate safe paths in addition to the fixed object reductions the number of safety paths are easier to tabulate nearer real-time. This helps to make safer and faster decisions in the limited timeframe from knowledge of an unavoidable collision event to avoidance or reduction impacts. This includes the decision to release or not to release the body from the platform, to fully or partially release from the platform, how to use the vehicle controls in advance of the release, direction for release, likely friction contact time and distance for reduction of inertia after the body is released and glancing blow calculations. Pre-planning by the safety module whether it is onboard or wirelessly supplied greatly increases the likelihood of a safety system to be successful at reducing injury.

In some embodiments, coordination of activities, like speed and direction are based on data from others with safety systems. For example, each AV has an intended path and is self-monitored for remaining on a known path. If a variation is required during transit based on unintended changes by others, this change of direction and speed is shared with others in the ZOI so all can make changes to avoid an accident. However, if a collision is unavoidable, the safety path decision including any intended separation of the body from the platform is shared and the resulting coordination of safety systems will result in injury reduction.

In some embodiments, the safety system is able to preplan the safety path options, as limited by remaining path pre-trip or early in trip calculated safety path options based on fixed obstruction limitations.

In some embodiments, the safety system paths are further limited by surface conditions using known surface types on this trip, weather reports for this time period and images of ground variations. Such surface evaluation is used to determine safety path estimated stopping distance to determine potential impacts based on friction values and the distance to bring a separated body or unseparated AV to a safe stop. In one extended example of weather-related, pre-safety analysis for safety path limitation planning, the AV may choose to take a different course to get from point A to point B. For example, it may redirect to avoid an overpass assumed or historically proven to have potential for black ice in these conditions.

In some embodiments, the safety system uses not only the historical and current status of the ZOI data-based separation decision making for full or partial release of the body (B) from the platform (P) but in conjunction with application of common controls of throttle, brakes, motor direction to the wheel(s) system to avoid or lessen contact and injury. Monitoring directly all moving objects as they come into and proceed through this AV vehicle's ($AV_1$) ZOI. This assures others are maintaining a safe path relevant to the $AV_1$ direction. When any ZOI AV diverts because of an unexpected occurrence it may cause further unsafe conditions from the pre-considered path for $AV_1$ in whole or in parts during a safety system action. This shared knowledge is applied to the $AV_1$ safety system actions to effect the safest outcome for itself and others involved.

In some embodiments, at some time in the future if all AVs and even bikers or pedestrians with cell phone coordination the coordination will be more encompassing to maintain smooth and safer flow by avoiding contact. However, in the meantime there will be more exceptional conditions that will require more safety system intervention.

In some embodiments, the safety systems of the present disclosure incorporates or makes use of one or more airbags that inflate to raise the body above any irregularities in the platform and/or to place the body on a level of exit better suited for the safety of the passengers. One non-limiting example is the fore and aft castings with battery construction format exhibited by Elon Must on Sep. 22, 2020 as part of a presentation on future EV and AV Tesla® platform. This leaves an irregular base for mounting a body and thus more difficult to separate and exit the body from the platform. With these and similar constructions, airbags can be used with the safety systems of the present disclosure to raise the body with separation, providing a way to implement the safety system with platforms that are designed with less than ideal exit configurations. In one published image of the Tesla® platform post-announcement mentioned above, it shows supportive-to-body features above the battery. These are assumed to provide a more uniform bottom for connecting the body. The release devices of the present disclosure remain applicable if nested in or around these features. Further, the castings shown may have permanent or activated openings for the tire to provide tire exposure for contact to the released body for positively directing the body on the safety path. Regardless of the moving tire to body option, the braking, throttling, aiming and removal of the body from the platform can send the body on a determined safety path.

BRIEF DESCRIPTION OF THE DRAWINGS

FIG. 7 is a simplified cross-sectional view of a portion of an AV and illustrating mechanical connection units in accordance with principles of the present disclosure;

DETAILED DESCRIPTION

Some aspects of the present disclosure are directed to systems, devices and methods for protecting passenger(s), cargo, etc., being transported in an autonomous electronic vehicle (AV), for example in the event of an imminent or unavoidable collision. In general terms, some embodiments of the present disclosure provide a safety system for installation to an AV, with the safety system including a release sub-system and a control sub-system. Other embodiments of the present disclosure provide an AV that includes the safety system. As described in greater detail below, an AV includes a passenger pod (or body) and a platform (or power unit or skateboard). The control sub-system is operable to designate that the AV will experience or is experiencing an unavoidable collision event (e.g., sufficient to cause injury to passenger(s) or harm to cargo), and to derive a safest path for the passenger pod. The control sub-system is further operable to cause the body/passenger pod and the platform to release from one another, via prompted operation of the release sub-system, in a manner that promotes the body/passenger pod traveling along the derived safest path. In some non-limiting examples, reversal of motor polarity by one or more of the wheel motors can assist in implementing a reduction in collision impact or avoidance of collision. In some non-limiting examples, an area of friction between one or more of the wheels and the body enhance sending of the body along a desired path, with or without reversal of motor polarity.

Today's advancements in software and hardware developments that permit the successful transport using fully autonomous AVs are now partially in use, at least in test, and broad implementation is assumed. The safety systems and methods of the present disclosure take an important further step forward to address the situation when an autonomous vehicle recognizes an imminent collision. Collisions by a well-governed AV can and will occur for various reasons, such as black ice, unexpected vehicle movements, pedestrians, bicyclers, storm obstructions, or other unpredictable or unavoidable circumstances. The systems and methods of the present disclosure recognizes the emergency status and provides an improved outcome.

Figure 1:
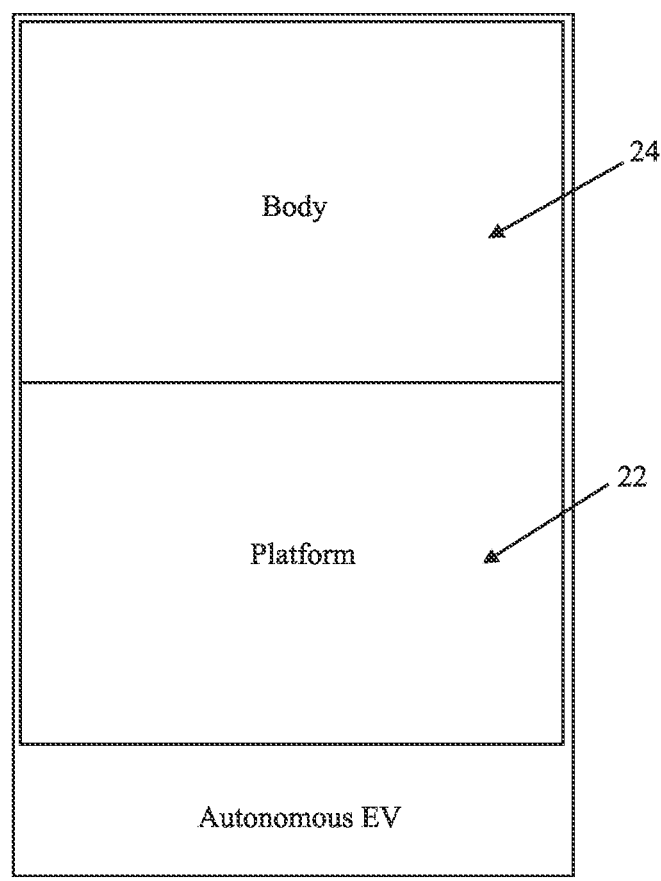
FIG. 1 is a block diagram representing major components of a prior art autonomous electronic vehicle (AV)

By way of background, there are several electronic vehicle (EV) and coming AV designs that use a common feature. It is the use of two major components to build the completed EV. One major component is sometimes called a platform (or power unit or skateboard) composed of the at least a battery, wheels, motors and steering. Then a second major component, the passenger pod, sometimes called the body, is designed to be attached to the platform. Some developments originate the two major components from two different companies with coordination. The terms "platform" and "body" are used in the present disclosure. Various controller(s), sensor(s), mechanism(s), etc., are then added to render the base EV design autonomous (e.g., converting the EV to an AV). Consistent with these explanations, FIG. 1 schematically reflects a conventional or prior art AV 20 as comprising a platform 22 and a body 24. The body 24 is permanently mounted to (or integrally formed with one or more components of) the platform 22, for example via bolts, welds, etc. One or more operational controllers (not shown) are provided with one or both of the platform 22 and the body 24, and generally comprise a computer or computer-like device (e.g., processor(s) or microprocessor(s) operating or programmed to operate (software) various instructions or logic, memory, storage device, etc.) that control normal operations of the AV 20 (e.g., turning engine on/off, speed, acceleration, steering, braking, etc.).

Figure 2:
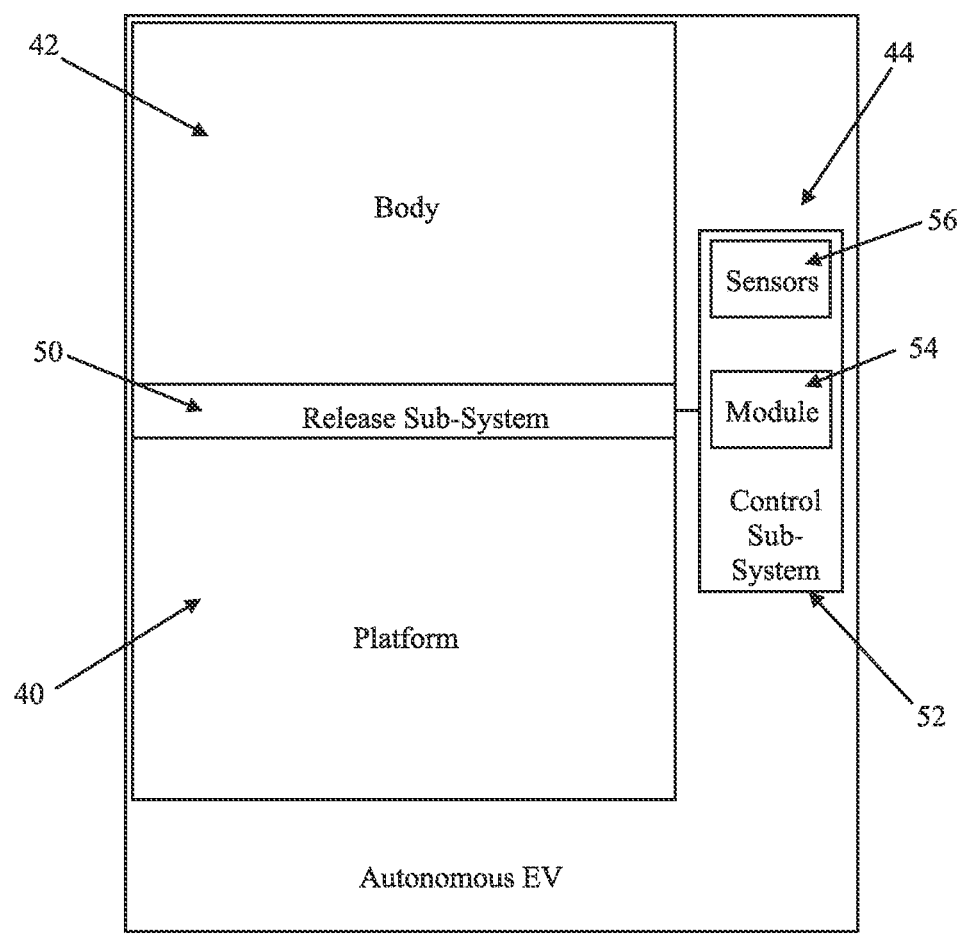
FIG. 2 is a block diagram of an AV in accordance with principles of the present disclosure.

With the above in mind, one embodiment of an AV 30 in accordance with principles of the present disclosure is shown in block from in FIG. 2. The AV 30 includes a platform 40, a body 42, and a safety system 44 (referenced generally). The safety system 44 includes a release sub-system 50 and a control sub-system 52. The release sub-system 50 includes one or more mechanical connection units that connect the platform 40 to the body 42 in a manner facilitating a robust attachment under normal operating conditions, as well as selectively releasing the platform 40 and the body 42 relative to one another when prompted by a safety control module 54 of the control sub-system 52 as described in greater detail below. The AV 30 further includes one or more operational controllers (not shown) as conventionally employed with an AV that control normal operations of the AV 30. The safety control module 54 can be incorporated into the operational controller(s) (e.g., software or programming operated by a processor of the operational controller). In other embodiments, the control sub-system 52 can include a dedicated computer or computer-like device separate from the operational controller(s) and operating the safety control module 54 otherwise programmed (e.g., logic, machine readable instructions, software, etc.) to perform the various safety-related features or instructions described elsewhere. In yet other embodiments, the safety control module 54 is operated (e.g., programmed to) by a computer entirely apart from the AV 30; with these and related embodiments, the safety control module 54 is in wireless communication with one or more operation controllers carried by the AV 30 to wirelessly implement a determined safety plan. As described in greater detail below, the safety control module 54 considers or monitors data from various sources in determining a safety plan for a particular set of circumstances associated with an imminent or unavoidable collision event. In this regard, the data can come from sensors provided with a conventional AV design. In other embodiments, the control sub-system 52 optionally includes one or more additional sensors 56 as described below (e.g., top-of-body mounted sensors) to broaden the scope of sensor input beyond the common AV scope of input.

The platform 40 can be, or can be akin to, the platform 22 (FIG. 1) associated with known or existing AVs. Thus, the platform 40 can include at least the requisite battery, wheels, motors and steering mechanism as known in the art for operation of an AV. In other embodiments, the platform 40 can include one or more additional components not typically utilized or provided with a conventional EV platform as described below. Similarly, the body 42 can be, or can be akin to, the body 42 (FIG. 1) associated with known or existing AVs. Thus, the body 42 can include at least an outer housing defining a compartment or other enclosed area for passengers, cargo, etc., along with door(s), window(s), etc. for accessing the enclosed area. In other embodiments, the body 42 can include one or more additional components not typically utilized or provided with a conventional AV body as described below.

The safety system 44, including the release sub-system 50 and the control sub-system 52, can assume various forms and incorporate various features as described in greater detail below. In general terms, the connectors or fasteners or mechanisms (or mechanical connection units) of the release sub-system 50 attach the platform 40 to the body 42 and are remotely controlled by the control sub-system 52 to perform the act of purposely timing and directing separation of the body 42 from the platform 40. The release sub-system 50 can optionally provide two or more points of connection or attachment between the body 42 and the platform 40. The purpose is to improve the safety outcome for passengers (or cargo) within or carried by the body 42 at least one of, optionally all of, before, during and after the event of an unavoidable collision.

In some embodiments, the safety system 44 is configured (e.g., the safety control module 54 of the control sub-system 52 is programmed) to determine and effect a best case timing and direction of movement of the body 42 away from the collision event location according to situational data analysis performed continuously during normal operation of the AV 30. This can be done so there is readiness and so the safety system 40 nests the preparation time and thus improves its ability to react more quickly and appropriately to an unavoidable collision situation. This, in turn, can result in a reduced impact, sequenced contact to improve or reduce hazards to passengers.

Figure 3:
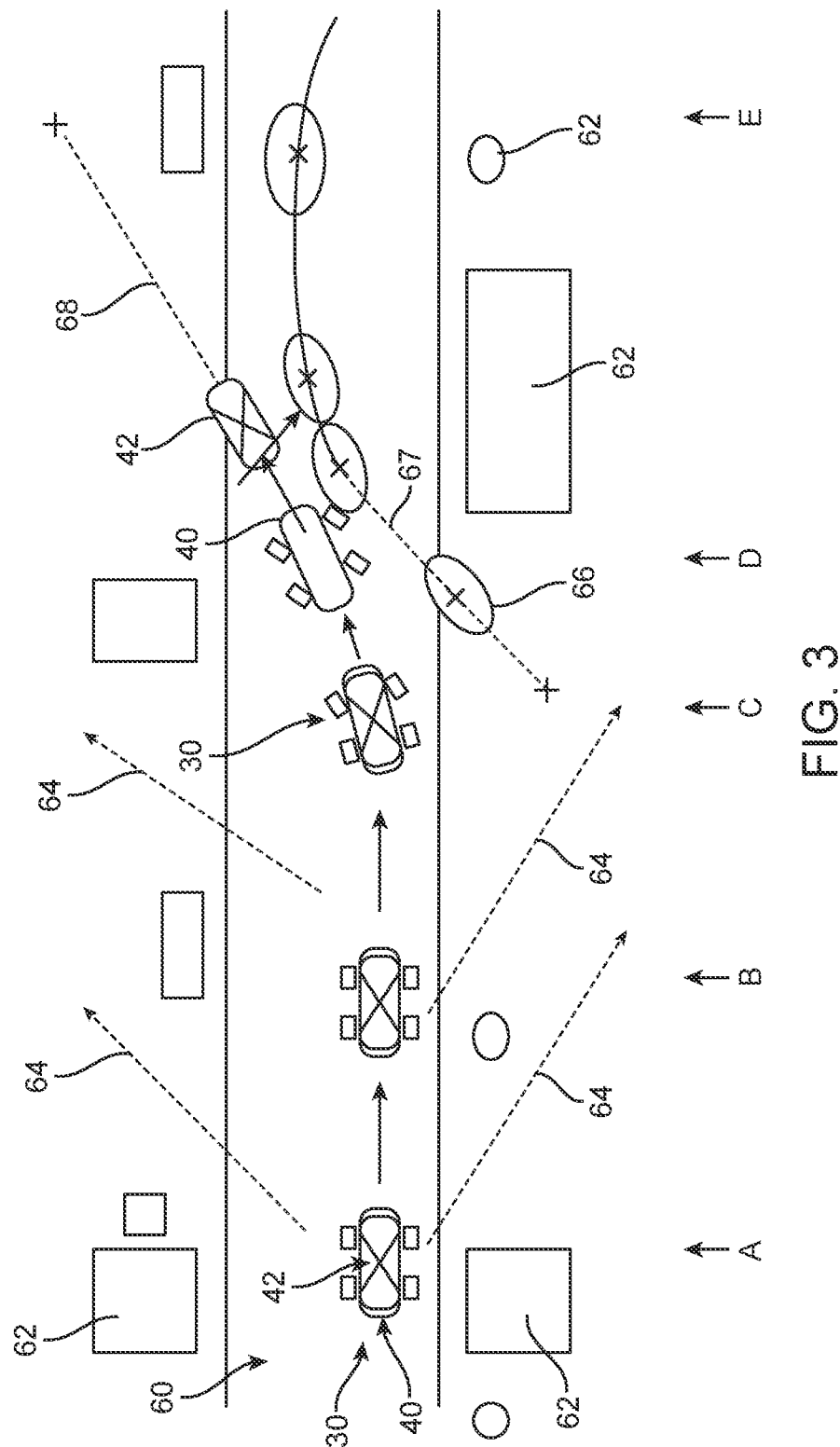
FIG. 3 schematically illustrates operation of AV safety systems in accordance with principles of the present disclosure.

By way of non-limiting example, FIG. 3 illustrates, in simplified form, sequential operation of the safety system 44 (FIG. 2) in the event of an unavoidable collision as the AV 30 is traveling along a road 60 with various road-side obstructions 62 (buildings, signs, lights, etc.). A point in time A, the AV 30 is traveling along the road 60 under normal operating conditions in a relatively straight-line path (left-to-right relative to the orientation of FIG. 3), for example as would a conventional AV, with the platform 40 attached to the body 42. Various sensor information and surrounding data is continuously being reviewed by the control sub-system 52 (FIG. 2). As reflected by dashed arrows 64, the safety control module 54 (FIG. 2) optionally operates to continuously determine possible safety travel paths otherwise avoiding the obstructions 62. This normal mode of operation continues at point in time B. At point in time C, an imminent or unavoidable collision event of the AV 30 with an object 66 (e.g., a vehicle determined to be entering onto the road 60; an obstacle/body accidently left on the road 60; etc.) is determined or estimated as being highly likely. The determination or estimation of an unavoidable collision event can be made by the logic/programming associated with the safety control module 54 (FIG. 2) and/or by logic/programming conventionally provided with some AVs. Regardless, upon determining that an unavoidable collision with the object 66 will occur (e.g., designated by dashed line 67 in FIG. 3), the safety control module 54 determines a safety or safest path (e.g., designated by dashed line 68 in FIG. 3) for the body 42 that avoids, to the extent possible, any road-side obstructions 62 and the object 66, and then operates the release sub-system 50 (FIG. 2) to release the body 42 from the platform 40 at a point in time D that is determined to "send" the body 42 along the safety path 68. It will be understood that immediately prior to release, the body 42 is traveling with the platform 40; thus, when released, the body 42 has momentum in a direction of the platform 40 at the time of release. Further, the AV 30 may be operated/controlled so as to minimize the likelihood of a direct collision with the object 66. These factors can be accounted for by the safety control module 54 (e.g., turning the platform 40 from the straight-line path between point in time C and point in time D). Once released, the body 42 travels long the safety path 68 and comes to rest at point in time E at a location free of any road-side obstacles 62. The platform 40 may be caused to take other evasive actions relative to the object 66. Regardless, passengers and/or cargo being transported by the body 42 are safely removed from the hazards of the collision with the object 66.

From the above descriptions, one safety value provided by the systems and methods of the present disclosure is a reduction of mass and inertia by sacrificing the platform 40. Another value potential is to use the platform 40 to create a safer path by sacrificing the platform 40 on the colliding force. It may avoid or deflect energy from the colliding force. In some embodiments, surfaces of the platform 40 can cushion this contact and create time to implement a desired safety path. Further, it may be deemed best for the body 42 to escape or reduce contact by using common control features of the AV 30, for example throttle, brake, brake regeneration, steering or wireless instructions to other AVs in the imminent collision zone so as to take corrective or clearance action and to time the exit for the desired safety path. The separation may have the best outcome if the body 42 separates based on braking of the platform 40 ahead of the collision. If the imminent collision event is a hit from behind while stationary, it may be best for platform-to-body connectors to be released with a specific timing based on, for example, compression of an energy absorption bumper provided with the platform 40. This decision may use data derived from a bumper-located sensor. A side impact in some situational analysis may sequence the connector releases to help the body 42 roll to the side of the platform 40. Other variations of connector release and use of forces upon the platform 40 or with the platform 40 upon the body 42 can be employed to improve the outcome for passengers of the body 42.

Figure 4B:
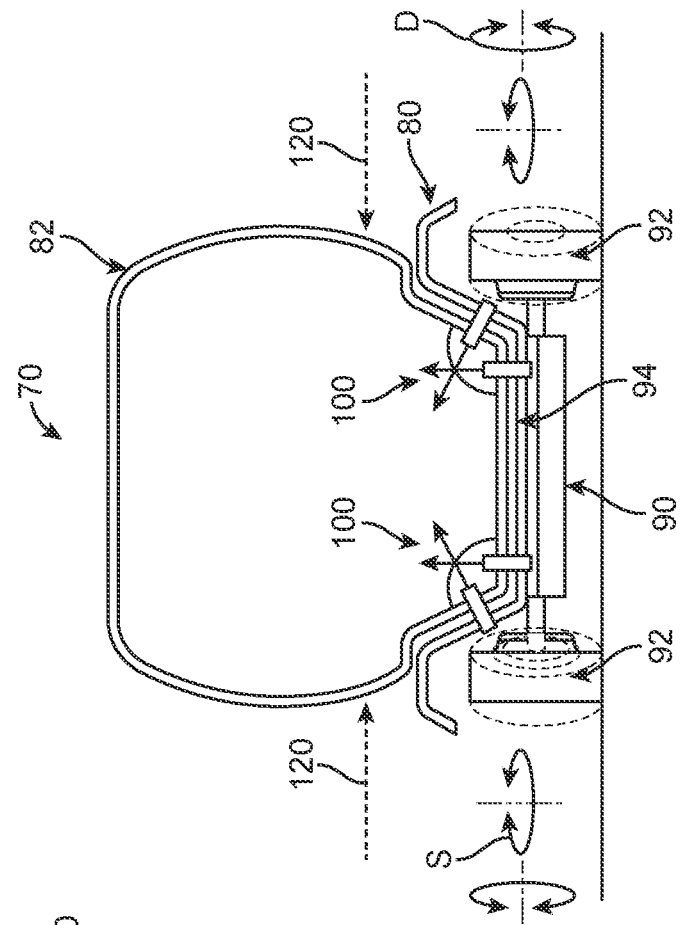
FIG. 4B is a simplified cross-sectional view of the AV of FIG. 4A.
Figure 4A:
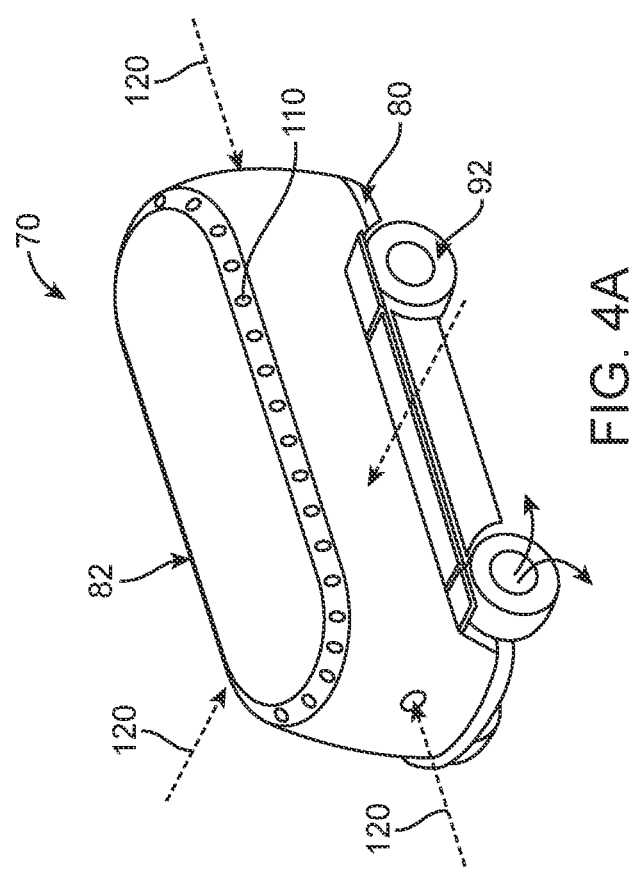
FIG. 4A is a simplified perspective view of an AV in accordance with principles of the present disclosure.

Operation of the safety system 44, and in particular the safety control module 54 of the control sub-system 52, in effecting a pre-planned best exit implementation process are further explained with reference to FIGS. 4A and 4B in which an AV 70 in accordance with principles of the present disclosure is illustrated. The AV 70 includes a platform 80 and a body 82 commensurate with the descriptions above. The platform 80 includes, amongst other components, a base 90 and various wheel assemblies. For example, FIG. 4B illustrates two wheels 92 linked to an axle 94 that in turn is connected to the base 90. Additional wheels 92 are shown in FIG. 4A. The wheels 92 are mounted so as to be rotatable relative to the base 90, and thus relative to the body 82, about a corresponding drive axis (labeled as D in FIG. 4B). Further, the wheels 92 can pivot or rotate about a corresponding turning or steering axis S (labeled as S in FIG. 4B). A steering mechanism (not shown) of a type known in the art can be connected or linked to one or more or all of the wheels 92 to effect desired steering or turning (e.g., in some embodiments, some of the wheels 92 can be positively or actively steered, while others of the wheels 92 more passively follow an effected turn). Regardless, the body 82 is connected to the platform 80 by components or mechanical connection units of a release sub-system 100 as generally reflected in FIG. 4B. Though not specifically identified in the views, a control sub-system commensurate with the descriptions of the present disclosure is further provided, and operates (e.g., a safety control module of the control sub-system is programmed) to prompt operation of the release sub-system 100 to disconnect the body 82 from the platform 80, for example under circumstances of an imminent or unavoidable collision.

In some optional embodiments, and as reflected by FIG. 4A, the AV 70 can incorporate sensors 110 along the body 82. Information from the sensors 110 can be utilized by the control sub-system (not shown) in determining a best exit path or safety path for the body 82 in the event of an imminent or unavoidable collision. In some embodiments, the sensors 110 can be of a type and location conventionally employed with AVs. In other embodiments, the sensors 110 can be configured and/or located intentionally for the safety methods of the present disclosure, and thus can be considered components of the control sub-system. Further, data from additional sensors (not shown), either on or apart from the AV 70, and/or other sources can be employed as part of the safety path determination algorithms of the present disclosure.

In the views of FIGS. 4A and 4B, dark lined, dashed arrows 120 represent but a few possible unavoidable forces that could act upon the AV 70 with a collision. Upon determining that a collision is imminent or unavoidable and the likely force(s) 120 that will be placed upon the AV 70 when the collision occurs, the control sub-system (and in particular the logic or algorithms acted upon or implemented by a safety control module of the control sub-system) determines a desired safety path for the body 82, and then implements various operational steps to implement the desired safety path. For example, one or more or all of the wheels 92 are caused to turn (about the corresponding steering axis) and/or are driven about the corresponding drive axis D. The release sub-system is prompted to release the body 82 from the platform 80, sacrificing power and inertia of the platform 80. The body 82 escapes from part of the force of impact of the imminent collision to scrub off energy over time and surfaces, thus improving a safety outcome for passengers in the body 82. The escape path of the body 82 can be in a direction opposite a current direction of travel of the AV 70 should a forward safety path be unavailable or less safe; for example, wheel friction on the body 82 can be used to send the body 82 in a direction away from the impending impact.

As a point of reference, FIG. 4B best reflects a common design feature of many AVs whereby the platform base 90 (typically comprised primarily of a battery) defines a common channel within which the body 82 generally resides. The battery is often used to form the platform base 90, with the base 90 used to mount the wheels 92 with motors at the side fore and aft. These necessarily extend below and above the platform base 90 and create a "containment" for the passenger body 82. In the common design of AV platforms with high wheel features (with or without the integrated motors of an REE.com type design), the wheels 92 become a built-in channel for "aiming" the body 82 at the moment of release from the platform 80.

Control Sub-System

Figure 5A:
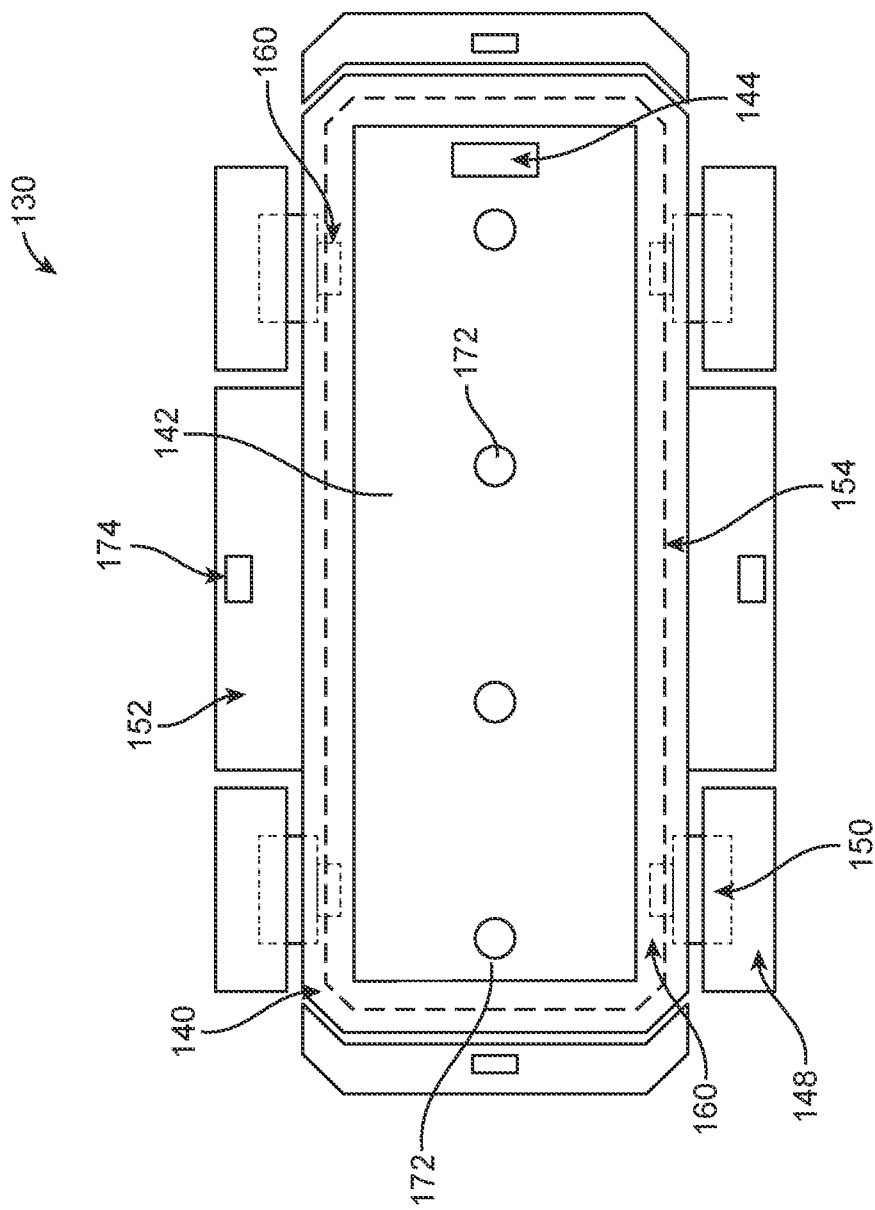
FIG. 5A is a simplified top plan view of an AV in accordance with principles of the present disclosure.
Figure 5B:
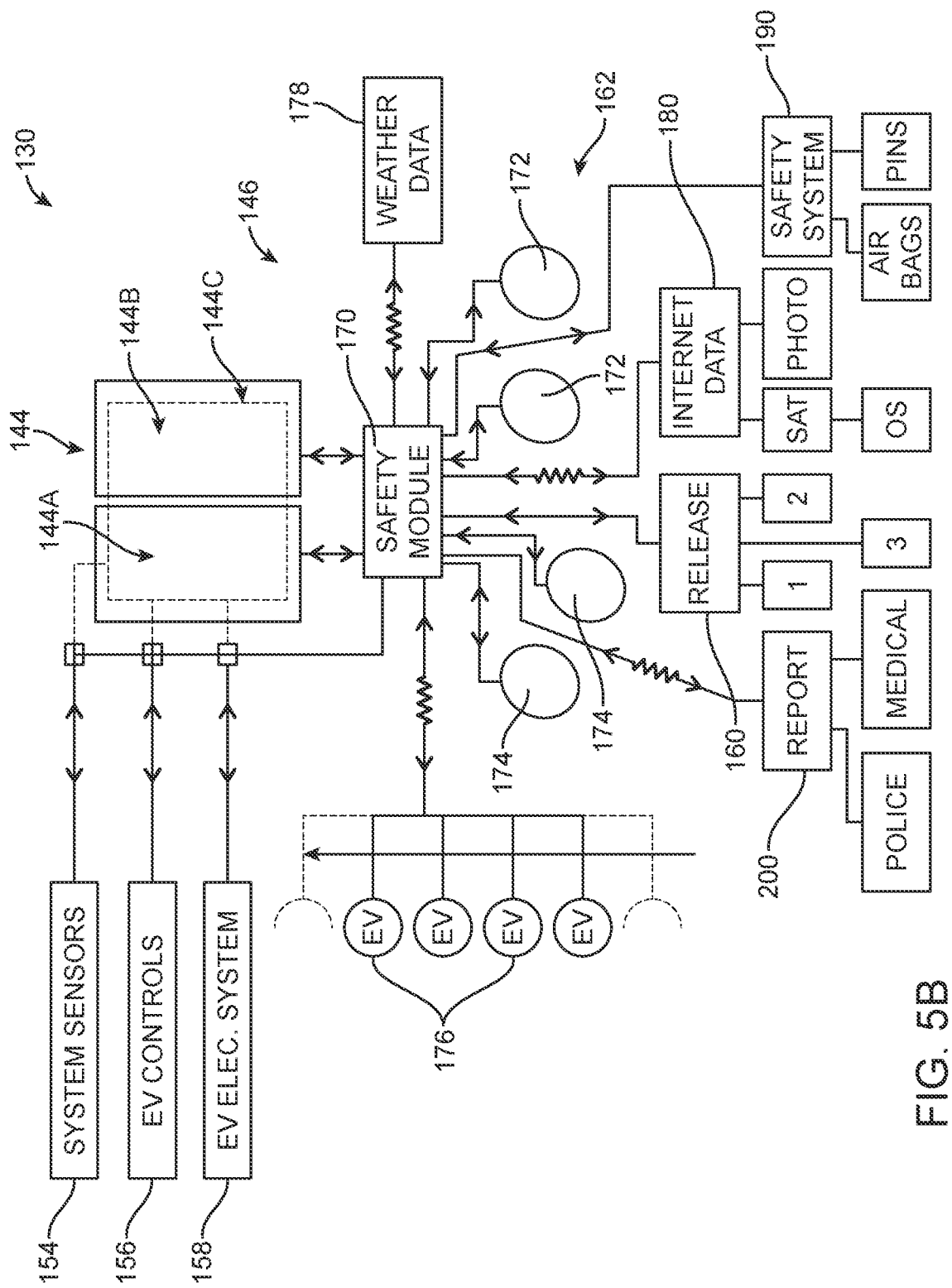
FIG. 5B is simplified block diagram of components of the AV of FIG. 5A, including a safety control module.

As will be understood by the above explanations, monitored data employed by the control sub-system 52 (FIG. 2) for determining the safety path can come from a variety of sources/sensors that may or may not be included with a conventional autonomous EV. With this in mind, FIG. 5A is a simplified representation of an AV 130 in accordance with principles of the present disclosure; FIG. 5B is a schematic diagram of sensors/controls provided with the AV 130. The AV 130 includes a platform 140, a body 142 (referenced generally in FIG. 5A), one or more operational controllers 144, and a safety system 146 (referenced generally in FIG. 5B).

The platform 140 can take any of the forms of the present disclosure, and in some embodiments can be, or can be akin to, a convention platform of a known AV. For example, the platform 140 includes wheels 148 (one of which is labeled in FIG. 5A) each powered or driven by a motor 150 (one of which is labeled in FIG. 5A). Similarly, the body 142 can take any of the forms of the present disclosure, and in some embodiments can be, or can be akin to, a convention body of a known AV. As best shown in FIG. 5A, in some embodiments, one or both of the platform 140 and the body 142 can include or carry bumpers 152 (one of which is labeled in FIG. 5A). The bumpers 152 can assume a variety of forms useful with AV's, for example crush-type bumpers as are known to those of ordinary skill.

The one or more operational controllers 144 are computers or computer-like devices programmed to perform conventional or standard AV control operations (e.g., speed, steering, braking, etc.). Labeling of the operational controller(s) 144 in FIG. 5B implicates that the operational controller(s) 144 can be carried by the platform (labeled as 144A), the body (labeled as 144B), or both the platform and the body (144C). As with conventional AV's, the operational controller(s) 144 can interface and/or communicate with various components of the AV 130, for example standard autonomous system sensors 154, standard AV controls 156, and standard AV electrical system 158. The standard autonomous system sensors 154 are also generally identified in FIG. 5A The safety system 146 includes a release sub-system 160 (referenced generally in FIG. 5A) and a control sub-system 162. The release sub-system 160 can assume any of the forms of the present disclosure, and generally includes components and/or mechanisms that attach the body 142 to the platform 140 in a manner permitting release of the body 142 from the platform 140 when prompted by the control sub-system 162.

The control sub-system 162 includes a safety control module or engine 170 that receives information from various sources and is programmed to determine a safety path in the event of an imminent or unavoidable collision event. The safety control module 170 can be incorporated into a computer or computer like device apart from the operational controller(s) 144, can reside in the operational controller(s) 144 (e.g., installed into a software application operated by the operational controller(s) 144), or can reside in a computer or computer-like device entirely apart from a physical structure of the AV 130 and in wireless communication with components of the AV 130 necessary to receive desired sensor information and prompt performance of a determined safety plan. In more general terms, the safety control module 170 can include or operate various algorithms, artificial intelligence/machine learning programming, and safety switches for performing the safety methods of the present disclosure. As further reflected by FIG. 5B, the safety control module 170 optionally includes one or more wireless communication devices (transceiver, Bluetooth, NFC, MICS, etc.) as is known in the art for reasons made clear below.

In some embodiments, the safety control module 170 communicates with or receives data/information from the standard autonomous system sensors 154 (e.g., 3D accelerometer, 3D gyroscope chip, distance sensors, camera image analysis, etc.). Other sensor-type information is also optionally reviewed or considered by the safety control module 170. For example, in some embodiments, the control sub-system 162 includes one or more broad area-type sensors 172 carried by one or both of the platform 140 and the body 142 that deliver sensed information or data to the safety control module 170. In some embodiments, the control sub-system 162 includes one or more bumper sensor 174 (e.g., at least one bumper sensor 174 is provided or embedded into each of the bumpers 152) that deliver sensed information or data to the safety control module 170. Additional sources of information or data for the safety control module 170 optionally include status and/or location information from other AVs operating near the AV 130 as indicated at 176 (e.g., can be wirelessly signaled to the safety control module 170); weather data 178 (e.g., wirelessly signaled to the safety control module 170); various internet-derived information or data 180 (e.g., satellite images, photos from the cloud, Google/Apple resources, etc.). Other sources of data can also be utilized by the safety control module 170. Regardless, the safety control module 170 is programmed to review or monitor available sources of information or data in continuously or periodically determining a safety path for the body 142 upon occurrence of an imminent or avoidable collision.

In this regard, having a predetermined safest action plan can be important given the presumed short time between confirming a forthcoming unavoidable impact and actual impact. By continually evaluating status and options, the safety control module 170 can determine the safest path and always be ready for an emergency situation. Using the remaining time for action to improve the outcome is thus extended and options broadened. This ongoing evaluation can provide a valuable readiness status, and can be beneficial to the safety systems of the present disclosure.

The safety control module 170 can be programmed to take various actions upon determining or being informed of an imminent or unavoidable crash event, and is connected (wired or wireless) to various components to implement a selected action. For example, the safety control module 170 is connected to the release sub-system 160, operating to prompt components/mechanisms of the release sub-system 160 to operate in a desired, coordinated fashion in releasing the body 142 from the platform 140. The safety control module 170 can further communicate with the standard AV controls 156 as part of a body release routine (e.g., controlled wheel steering or speed coordinated with releasing operation of the release sub-system 160, reversing polarity of a motor associated with one or more of the wheels, etc.). Optionally, the safety control module 170 communicates (wired or wireless) with, and prompts operation of, other components of the AV 130, such as standard safety system devices 190 (such as air bags), devices that extend to create friction, cushion impact, etc. Optionally, the safety control module 170 is programmed to generate an emergency report 200 in the event of a collision, and communicates the report (e.g., wireless communication) to appropriate sources, such as police, medical, etc.

Figure 6:
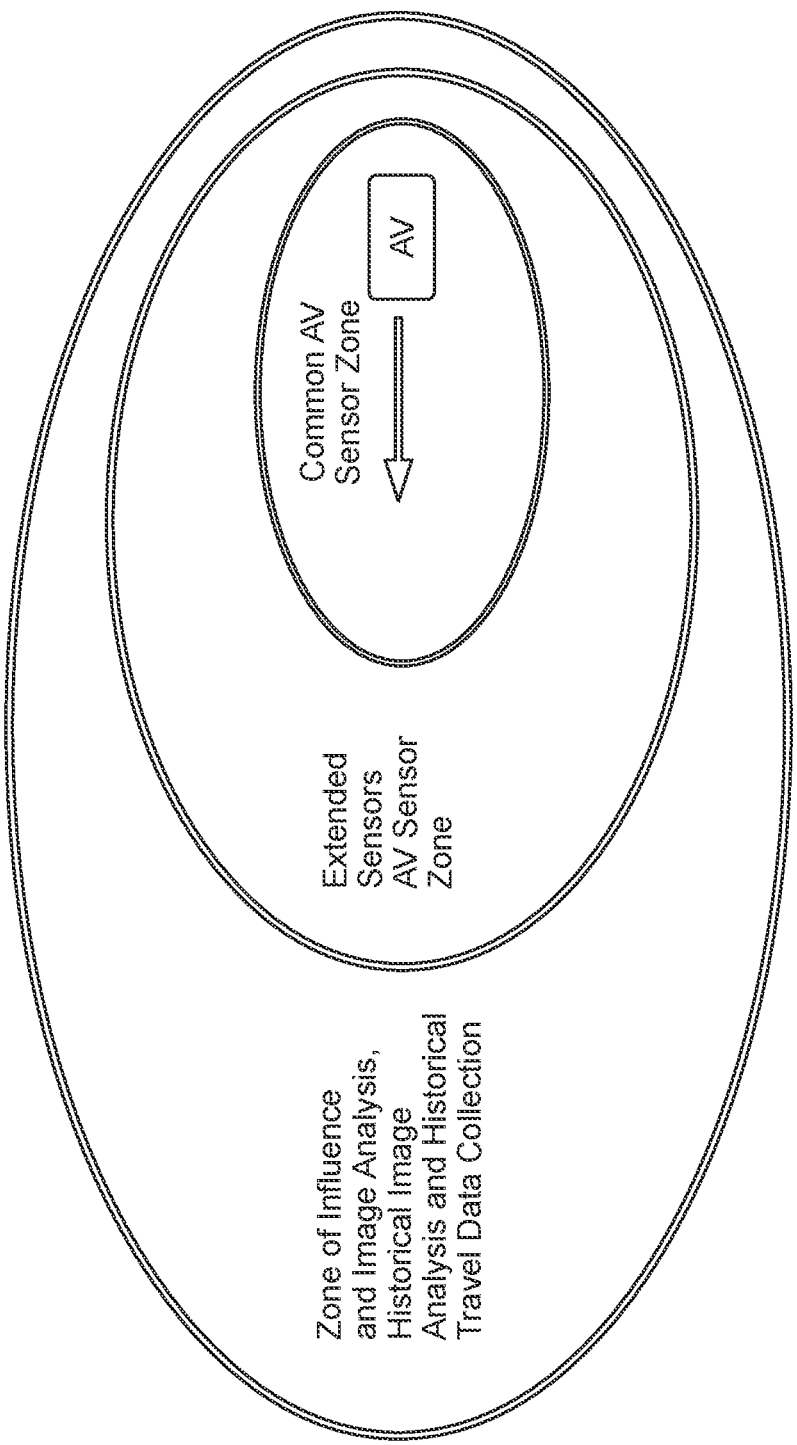
FIG. 6 graphically illustrates possible sources of data or information for consideration by the by safety control module of FIG. 5B.

From the above descriptions, the monitoring of surrounding activities by the safety control module 170 can include that already being performed by conventional AV systems and related sensors. However, in some embodiments, situation data input can be further enhanced to include accounting for fixed objects within the range of the body 142 after being separated from the platform 140. This data can be available, for example, online for most roads and road adjoining areas from captured images. It can also be enhanced in some embodiments by adding longer-range cameras or other sensors mounted, for example, on top of the body 142 and/or on extensions projecting above a roof of the body 142. It can also be enhanced by information coming from other AVs and their sensors in the zone of influence. Regardless, the standard AV sensors work in combination with the extended area sensors from fixed objects, cameras or moving AVs, and/or Internet obstruction data. Where employed, this information is used or considered to generate the safest impact free or reduced impact safety path for the body 142. FIG. 6 graphically illustrates the possible expansion of data made available to the safety control module 170 beyond sensors commonly provided with AVs.

Returning to FIGS. 5A and 5B, in some embodiments, the safety control module 170 is programmed to consider or determine surface types where the body 142 can use sliding contact to better scrub off energy on the ground or obstacle surfaces. It can also consider glancing, bouncing, rubbing-off energy intermittently along the safety path in some embodiments. The selected safety path desirably provides the least harmful single or multiple impacts to the body 142 during the act of stopping. This sequence can extend and reduce the impending collision to reduce injury to passengers of the body 142.

In some embodiments, the safety systems and safety control modules of the present disclosure use only the standard sensors and computing typically provided with an AV to prompt operation of the release sub-system for a safer outcome. Alternatively, additional data can be monitored to help decide an even safer path for the body 142 upon ejection or release from the platform 140. This additional data can come from one or more sources by analysis and artificial intelligence (AI). For example, additional sensors can be provided with a longer range but use that data quickly based on it being determined to show or implicate a bush or tree. One is a positive and the other is a negative to safety. Real-time sensors when mounted higher on the AV can be combined with Internet-retrieved ground or satellite images in combination with real-time site input. These additional cooperative data sources can improve the separation or release decision making, and can provide a strong likelihood for safer separation type and time and direction for the body 142 and the platform 140. In some embodiments, previous AV traffic gathers their sensor data to confirm and add to or subtract from shared data. This additional cooperative data source can continue to improve the basis for release decision making, and can provide a stronger confidence factor for safer separation type, sequence, timing and direction for the body 142 and the platform 140 decisions for passenger protection.

As mentioned above, in some embodiments the safety control module 170 can consider or review the internet-derived information or data 180 in determining a desired safety path or actions. For example, internet images can be useful. A Google map satellite image, for example, may show curbs, fences, abutments, buildings, trees, bus stop enclosures, hydrants and other obstructions. This information can assist in the safety control module 170 in the preparation and programming to find the safest exit path for the body 142. Readiness can be improved. Timing can be broadened to permit more and safer options. Terrain for bouncing or scraping off energy can be considered for possible safety paths. This may include, for example, a decision to direct the body 142 to travel and rest in a field, grassy yard, pond, park or parking area to improve readiness and quality of escape decision-making.

The systems and methods of the present disclosure optionally employ artificial intelligence and techniques. For example, the percentages of likelihood for correctness of received data or information can be determined, such as the age of a satellite photo versus a broad area real-time sensor. Comparison analysis algorithm or validation prior to including or excluding received data can be performed in some embodiments.

Processes performed by the safety control module 170 can, in some embodiments, include the consideration of the platform 140 and/or the body 142 upon other AVs, pedestrians, bikers, and others in general. A series of sensor data from different directions can identify a biker and forecast progress for future traffic, for example.

As mentioned above, one of the benefits of the systems and methods of the present disclosure by separating the body 142 from the platform 140 is the reduction of weight (and thus inertia) when moving by abandoning the platform 140. The safety systems of the present disclosure optionally further utilize operational control of the platform 140. This can be done to reduce speed, redirecting the body 142 and the platform 140 to reduce possible injury, including the reduction or elimination of possible injury to others outside of the body 142. Optionally, the systems and methods of the present disclosure can include continued wireless coordination with other AVs. In yet other embodiments, the safety systems of the present disclosure can be configured to deliver warning to others using their mobile devices and/or speakers carried by one or both of the platform 140 and the body 142 to alert pedestrians, bikers, etc.

In some embodiments, the safety systems of the present disclosure utilize crush zones as part of the direction, speed or impact decision variables. As a point of reference, some AV platforms are not designed for crushing as the battery carried by the platform is a major portion of the structure. With this in mind, some optional embodiments of the present disclosure improve safety by using crush zone(s) (e.g., the crush bumpers 152) as a sacrificial "egg crate" or compression zone(s) of mechanical devices. The crush zones or bumpers can be on the ends of the AV, sides of the platform 140, and/or around the body 142. These crush or compression zones, where provided, can further carry or include sensors to assist in the safety system decision making.

In more general terms, the safety systems of the present disclosure, for example the safety control module 170, can be programmed to perform and implement various processes. These can include, but are not limited to, the safety action (e.g., "yes" or "no" to releasing the body 142 from the platform 140), safety action sequence (e.g., "yes" or "no" for more than one body-to-platform release and timing of same), safety assist using common controls (determining which available controls are required to meet the safety implementation, and how and when to use them), and safety path selection (direction for the body 142 upon separation from the platform 140). Further, the safety systems of the present disclosure can optionally create a desired path for the body 142 by, for example, governing other AVs, announcements or warning sounds, and/or lights, deploying body extensions such as an air bag or wind scoop to increase drag, etc.

The decisions outlined above can be based upon an analysis of available data that serves to inform the safety control module 170 to enact a safer outcome. This can include the safety of others in the expected impact area. The safety processes of the present disclosure can optionally be improved by continuously monitoring the changing physical status surrounding the AV 130, allowing the safety control module 170 to make better conclusions by being better informed and having more options for escaping or reducing hazards. The surrounding status can be evaluated so that the safety control module 170 "knows" more about the area surfaces as the AV 130 proceeds to a destination. With this information, an intent for the body 142 upon separation from the platform 140 can be determined and implemented. The safety control module 170 can consider the environment, including fixed, temporary, and/or moving obstacles. The safety control module 170 can optionally be programmed to consider removing energy of the released body 142 by friction, including cooperative friction and redirecting with other AVs. The safety control module 170 can optionally be programmed to consider friction interactions of the body 142 with the ground or other fixed surfaces. The safety path analysis can continuously determine a selected safest option or options in preparation for a possible imminent or unavoidable collision event so this time is nested. With these optional embodiments, a more effective reaction time can be provided before an actual unavoidable collision event occurs. Thus, the calculations and direction for exit strategy are done in advance, and the actual safety system timing can provide more options for a better outcome. This includes a better outcome not only for passengers of the body 142, but for all potentially involved in and around the event.

All normal controls of the AV 130 can be available to assist in the implementation of the safety plan generated by the safety control module 170. By way of non-limiting example, the AV 130 can be caused to speed up and then brake with timed release of the body 142 from the platform 140 as the wheels of the platform 140 direct the body 142 to the safety path ahead of the collision. The platform 140 may then turn as a blocker into the path of the collision to absorb or deflect to best protect the body 142 as it escapes.

In some embodiments, the safety systems of the present disclosure, for example programming, algorithms and/or logic provided with the safety control module 170, can use the autonomous automation system for normal operation, but also to compare the AV 130 with other's past and current data gathering to determine how best to direct the platform 140 and the body 142 while attached and when separated to proceed most safely to a stop through traffic, on roadways and surrounding areas. To accomplish this, the safety control module 170 can also use data from the Internet about the area in question to avoid other impacts, and optionally adjoining terrain and obstacles to find a best solution. In some embodiments, the safety control module 170 can be programmed to, where possible, avoid a possible imminent collision if it is determined that sufficient space, speed and time are available. Under these circumstances, the safety control module 170 can prompt performance of the necessary collision avoidance steps and need not prompt release of the body 142 from the platform 140. Similarly, in some embodiments the safety control module 170 can be programmed to evaluate objects (e.g., vehicles) approaching the AV 130 from behind (e.g., the AV 130 is stopped at a stop light and another vehicle is traveling toward the AV 130); where it is determined that the approaching object cannot stop in sufficient time, the safety control module 170 can prompt performance of evasive actions (e.g., releasing the body 142 to move upon impact, moving the AV 130 out of the away of the approaching vehicle, etc.).

In some embodiments, the safety control module 170 is programmed to share decisions and readiness with the safety control modules of other AVs 176 active in the area of influence so they can coordinate for additional safety. For example, the two safety control modules can generate and implement a coordinated plan, directing the two released bodies to make the best of a bad situation. An icy road may cause an unavoidable collision, but handshaking decisions, such as which AV goes left and which AV goes right at the last moment, can greatly reduce the impact for both. Further, the reduction of mass by disposal of the platforms can improve the outcome for both bodies (and thus the passengers). One possible benefit is the reduction of inertia and mass. The protective enclosure remaining around the passengers by the body is better removed or angled from the collision source. The location, mechanical design, sequencing of separation or time (and similar safety impacting the AV design) can further provide options for the use of autonomous directing. The automated motion reasoning is thereby improved by two safety control modules working in combination regardless of any body/platform separation decisions. This can improve the amount of time to stop for the passengers, impact suddenness reduction, impact point multipliers to become force distributors and can make the impact inconsequential (or less consequential) to reduce or eliminate injury by eliminating or reducing sudden impact(s).

It is contemplated that AVs will be both in and out of passenger service. For example, an AV may autonomously be moving to pick up passengers or deliver items. In some embodiments, the safety control module of a particular AV can be informed of and consider an out-of-passenger service status. For example, an exchange right-of-way (ROW) "rule" can give the out-of-passenger service AV less priority for body release/extraction for safety reasons than other AVs on the road with passengers. Thus, the safety control module can decide to allow the out-of-passenger service AV to impact the obstruction as complete AV (i.e., the body not separated from the platform), or permit separation as requested by the safety control module of another AV to accommodate the safety of the passengers of that other AV.

Release Sub-System

The release sub-systems of the present disclosure can assume various forms that provide robust attachment or connection between the body and platform under normal operating conditions, and facilitate partial or complete release of the body from the platform when prompted by the safety control module. The release sub-system can include mechanical, magnetic or breakaway features (also referred to as "mechanical connection units") that can be activated by the safety control module, and can be designed to implement a safety action or actions speedily. The release sub-system is optionally capable of using releases and controls sequentially to redirect each major component of the AV for the overall purpose of improving passenger outcomes.

In some embodiments, the release sub-system can include mechanical connection units (e.g., components, devices or mechanisms) that effect mechanical connection/disconnection between the physical structures of the body and platform. Optionally, the release sub-system can further include electrical connection units (components, devices or mechanisms) that effect disconnection of wiring or other flexible cable running between the body and platform. The mechanical connection units that otherwise make the AV a working transportation device may be located in the common surface area between the body and the platform, at the enclosure of fixed wheel covers (where provided), at the fore and aft ends of the platform and body, etc. Regardless, the mechanical connection units can be prompted to release the body from the platform simultaneously or sequentially (depending upon a selected safety path or action, for example) to affect the timing and redirection for the determined safest extraction of the body.

With respect to mechanical connection units between the body and platform, mechanical releases of the present disclosure can be designed to be quick, dependable and under control while the AV is either moving or stationary. The mechanical capture desirably provides both the option of retention and release.

For example, FIG. 7 illustrates portions of one example of a mechanical connection unit 200 useful with the release sub-systems of the present disclosure as part of an AV 210. The AV 210 includes a platform 212 and a body 214 that can be akin to any of the platforms and bodies, respectively, of the present disclosure. In some embodiments, the platform 212 includes a housing 220, a power unit (e.g., battery) 222, and wheel assemblies 224 (a portion of one of which is shown in FIG. 7). The housing 220 defines a base wall 226 and a side wall 228. A skid plate 230 is optionally attached to and extends along an exterior of the base wall 226 (e.g., the skid plate 230 can be ultra-high molecular weight (UHMW) material, steel or other structurally rigid material welded or adhered to the housing 220). The power unit 222 is maintained within the housing 220. The wheel assembly 224 includes a wheel 232 mounted to an axle that in turn extends through the housing 220. Mounting of the wheel 232 can provide for active or passive steering. The body 214 forms an enclosure zone at which passengers and/or cargo can reside, such as at least partially by a floor panel 240 and a side panel 242. In some optional embodiments, the body 214 can include a skid plate 244 attached to and extending along an exterior of the floor and side panels 240, 242 as described in greater detail below. Other constructions for the platform 212 and the body 214 are also acceptable.

With the above, general construction of the platform and body 212, 214 in mind, the mechanical connection unit 200 includes one or more solenoid actuators 250. Each of the solenoid actuators 250 includes a case 252 and one or more pins or plungers 254 (labeled for one of the solenoid actuators 250 in FIG. 7); for example two of the pins 254. As is understood by one of ordinary skill, components within the case 252 (e.g., electrical coil) operate to dictate a position of the pins 254 relative to the case 252. In the arrangement of FIG. 7, the solenoid actuators 250 have been operated to locate the corresponding pins 254 in an extended position; further, each of the solenoid actuators 250 can be operated to retract the corresponding pins 254 from the extended positon. The housing 220, the optional skid plates 230, 244, and the body 214 can form an aperture sized to slidably receive a corresponding one of the pins 254, with the so-formed apertures being aligned with one another upon final assembly. Each of the solenoid actuators 250 are mounted relative to the body 214 such that in the extended position, the corresponding pins 254 extends through a panel of the body 214 (e.g., the floor panel 240 or the side panel 242) and one or both of the optional skid plates 230, 244 and a wall of the housing (e.g., the side wall 228), thereby interconnecting the platform 212 and the body 214. In a retracted position of the pins 254, the platform 212 is no longer interconnected to the body 214 at the corresponding solenoid actuator. A safety control module (not shown, but akin to the safety control module 170 of FIG. 5B) is operatively connected to each of the solenoid actuators 250 and operates to dictate a position of each of the pins 254 (e.g., the solenoid actuator 250 can normally assume an "on" state in which the corresponding pins 254 are in the extended position, and when signaled by the safety control module, transitions to an "off" state in which the pins 254 are retracted).

With the non-limiting example of FIG. 7, two of the solenoid actuators 250 (and four of the pins 254) are illustrated as effecting a connection between the platform 212 and the body 214 in a region of the wheel 232. Similar solenoid actuators and mountings can be provided at regions of other wheels of the platform 212. The solenoid actuators 250 can optionally be arranged so as to provide one, two, or more solenoid-based connections at the base wall 226 and the floor panel 240, and at the side wall 228 and the side panel 242. Any other number of solenoid actuators 250, more or less than two, is also acceptable. Further, while the solenoid actuators 250 are shown as being mounted to the body 214, in other embodiments, some or all of the solenoid actuators 250 can be mounted to the platform 212.

Figure 8A:
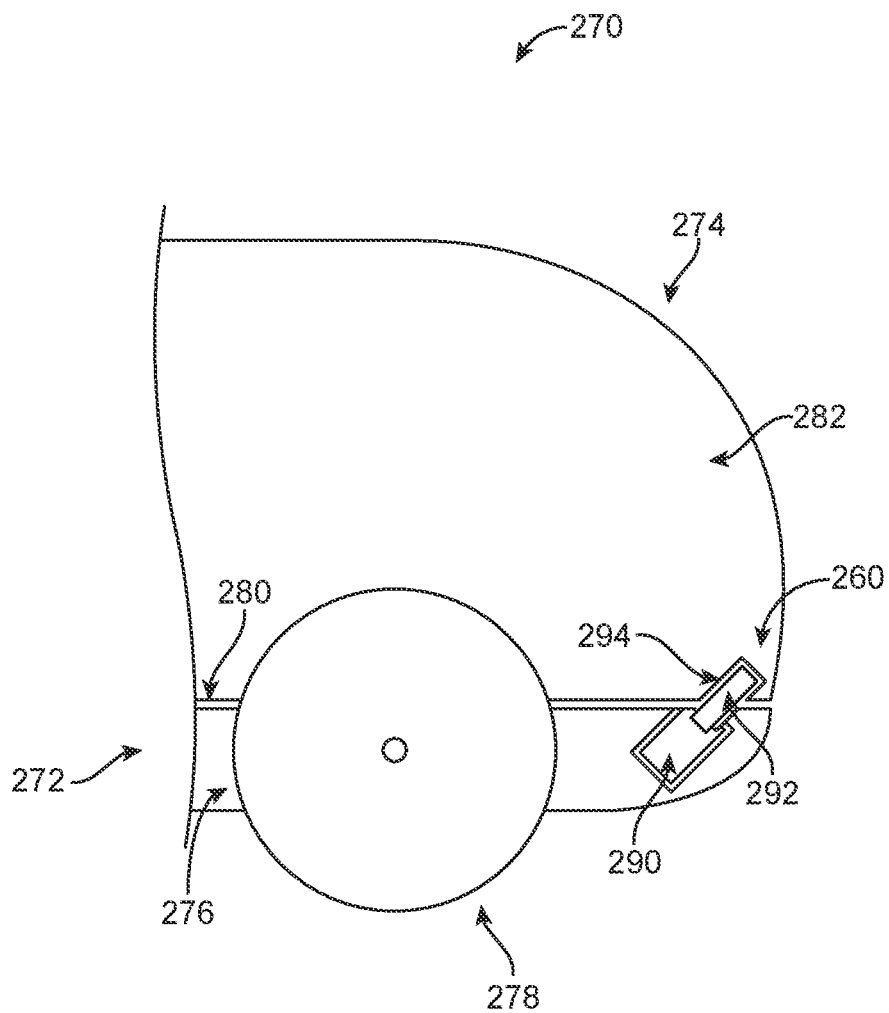
FIG. 8A is a simplified side view of a portion of an AV and illustrating a mechanical connection unit in accordance with principles of the present disclosure and in a connected state.

FIG. 8A illustrates portions of another example mechanical connection unit 260 useful with the release sub-systems of the present disclosure as part of an AV 270. The AV 270 includes a platform 272 and a body 274 that can be akin to any of the platforms and bodies, respectively, of the present disclosure. In some embodiments, the platform 272 includes a base wall 276 and wheel assemblies 278 (a portion of one of which is shown in FIG. 8A). An optional low friction skid plate 280 can be assembled to or formed by the base wall 276. The body 274 includes a housing 282 forming an enclosure zone at which passengers and/or cargo can reside. Other constructions for the platform 272 and the body 274 are also acceptable.

Figure 8B:
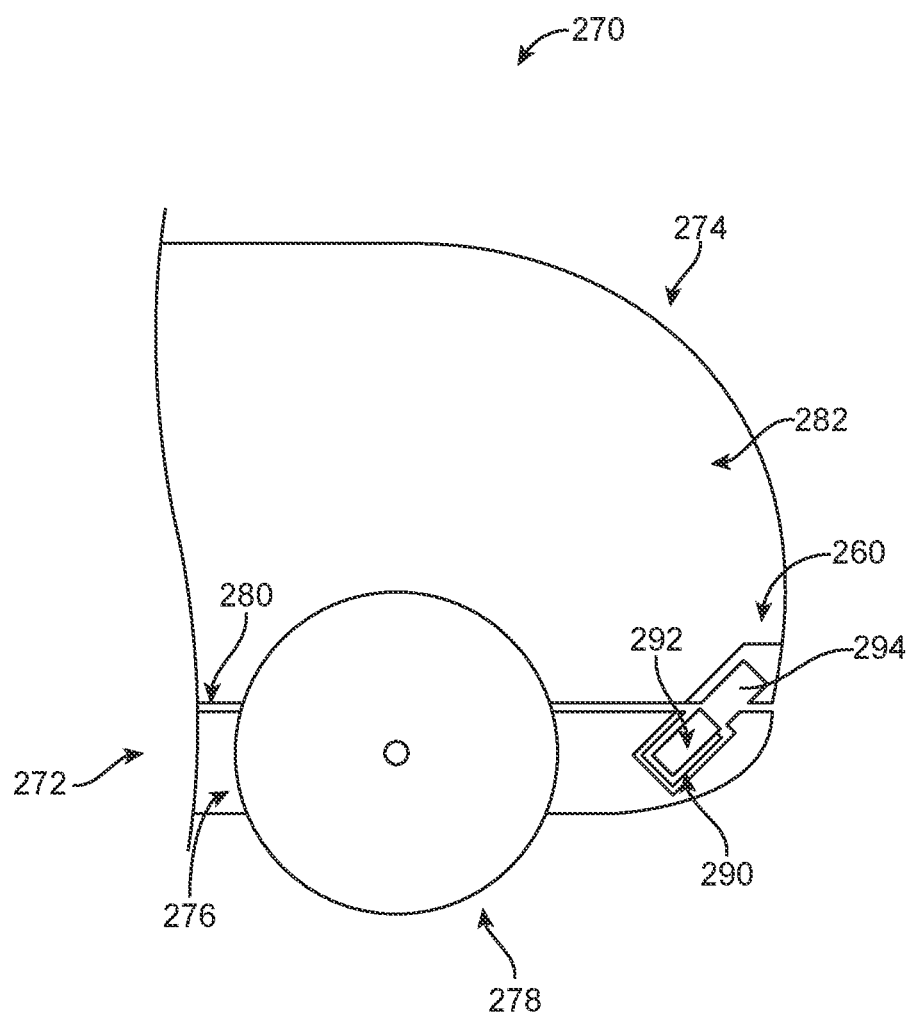
FIG. 8B is the AV of FIG. 8A with the mechanical connection unit in a disconnected state.

With the above, general construction of the platform and body 272, 274 in mind, the mechanical connection unit 260 includes a solenoid 290 operable to move a catch pin 292 between a connected state (reflected by FIG. 8A) and a disconnected state (shown in FIG. 8B). The solenoid 290 is mounted to the platform 272, with the body 274 forming or defining a slot 294 sized and shaped to receive and capture the pin 292 in the connected state. The solenoid 290 as assembled to the platform 272 aligns the catch pin 292 with the slot 294. In the connected state of FIG. 8A, then, the catch pin 292 is captured within the slot, such that the mechanical connection unit 260 interconnects the platform 272 and the body 274. A safety control module (not shown, but akin to the safety control module 170 of FIG. 5B) is operatively connected to the solenoid 290 and operates to dictate a state of the catch pin 292 (e.g., the solenoid actuator 290 can normally assume an "on" state in which the pin 292 is in the connected state or extended position, and when signaled by the safety control module, transitions to the disconnected state in which the pin 292 is retracted). FIG. 8B illustrates the disconnected state in which the catch pin 292 has been retracted from the slot 294, releasing the body 274 from the platform 272. While the solenoid actuators 290 is shown as being mounted to the platform 272, in other embodiments, the solenoid actuators 290 can be mounted to the body 274. Further, additional mechanical connection units 260 can be provided with the AV 270, for example one (or more) mechanical connection unit 260 near each of the vehicle's wheels.

In one variation, the body 274 is elevated from the platform 272 and when the catch pin 292 is retracted to release the body-to-platform attachment, the body 274 drops to the optional skid plate 280 (e.g., ultra-high molecular weight (UHMW) plastic) so that the gap over the wheels is eliminated and the wheel can, in a determined direction and speed, use that friction to speed the exit of the body 274 from the platform 272 on the predetermined safety path.

Other mechanical connection unit constructions are also envisioned. For example, the capture or catch pins of FIGS. 7 and 8 can be mounted to the body, the platform, or a combination thereof. The mechanical mechanisms or devices useful with the release sub-systems of the present disclosure can include springs, pneumatics, hydraulics, magnetics, electrical solenoids, explosives, etc., or combinations thereof. For example, many controlled breakaway feature options can deliberately activate the safety system using engineered materials as a force to maintain a connection up to a point of desired release. Bolts are available with these limits and could be employed to hold the body to the platform. An adjoining force mechanism can be made to exceed the engineered break force of the bolt(s) when safety breakaway is desired. One example of a mechanical solenoid activated capture sleeve, pin-in-slot, is shown in FIG. 7 as described above. It will be noted the manner in which the pin is captured and released, and may use either the solenoid product types of "push" or "pull". Thus, the retention can be held under power or non-power. Either way, the captured and released pin when released can provide determined capture or release control.

Figure 9:
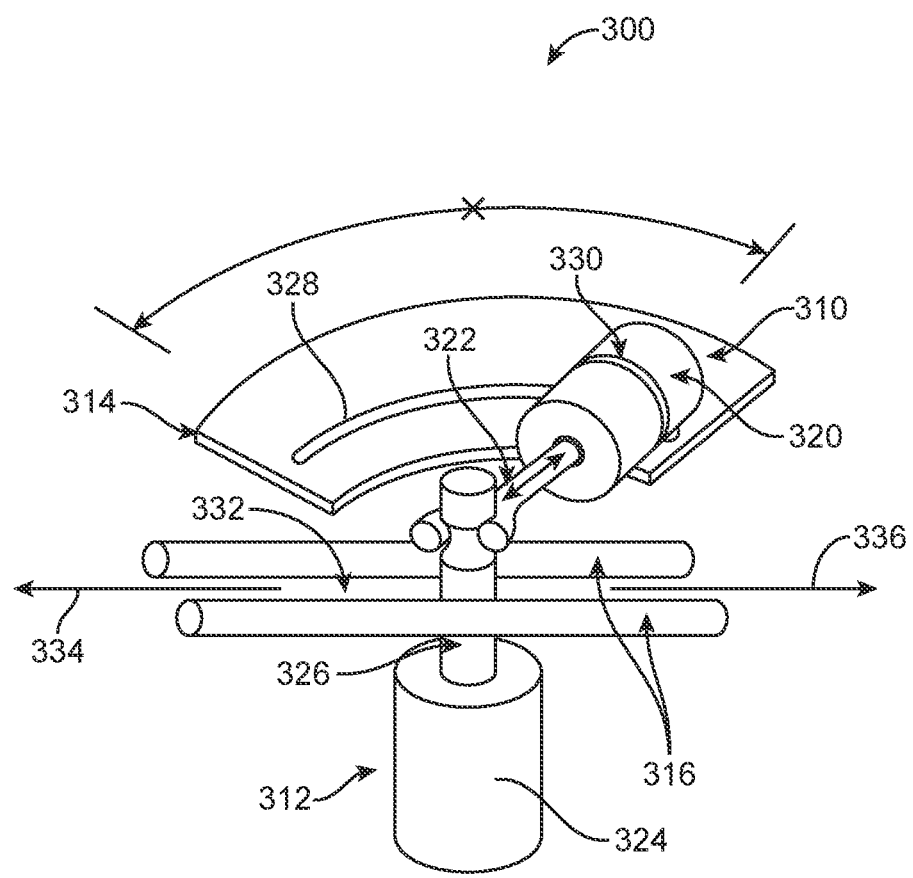
FIG. 9 is a simplified perspective view of a mechanical connection unit in accordance with principles of the present disclosure.

Optionally, directivity with the release sub-systems, and in particular mechanical connection units, of the present disclosure can be aided by a rail, a slot or platform channel created by the wheels. The release can be mounted to the bottom surface or the wheel enclosure surfaces, from on the platform ends, or some combination of the same. For example, FIG. 9 illustrates portions of another mechanical connection unit 300 useful with the release sub-systems of the present disclosure, and includes a first solenoid actuator 310, a second solenoid actuator 312, a guide plate 314 and guide rails 316. The first solenoid actuator 310 can be akin to a conventional solenoid, and includes a case 320 and a capture arm 322. The second solenoid actuator 312 can be akin to a conventional solenoid, and includes a case 324 and a pin 326. The pin 326 is sized to be selectively engaged by the capture arm 322.

The guide plate 314 is mounted to the body (not shown) of the AV, for example in a region of a wheel associated with the body of the AV. The guide plate 314 defines an arcuate slot 328. Upon final assembly, the case 320 of the first solenoid actuator 310 is slidably connected to the guide plate 314 at the arcuate slot 328 (e.g., by a rib 330), allowing the case 320 be selectively held at a desired location along the arcuate slot 328. With this construction, then, the first solenoid actuator 310 is secured to the body.

The guide rails 316 are also mounted to the body (not shown) in a manner establishing a gap 332 therebetween. A size of the gap 332 is selected to be slightly larger than a diameter of the pin 326.

The second solenoid actuator 312, and in particular the case 320, is mounted to a platform (not shown) of the AV. In other embodiments, the first solenoid actuator 310, guide plate 314 and guide rails 316 are associated with the platform, whereas the second solenoid actuator 312 is mounted relative to the body.

Upon final assembly of the mechanical connection unit 300 with the AV platform and body (not shown), the second solenoid actuator 312 is aligned with the guide rails 316 such that in an extended position, the pin 326 extends through the gap 332. With this construction, a directional force applied by the platform onto the second solenoid actuator 312 is transferred to the body via interface between the pin 326 and the guide rails 316 (represented by arrows 334, 336 in FIG. 9). Further, with the capture arm 322 and the pin 326 both in their extended positions, the capture arm 322 engages the pin 326, thereby establishing a robust connection between the body and the platform. The force required to release the first and second solenoid actuators 310, 312 from one another can be varied (for example based on AV speed) by moving the case 320 of the first solenoid actuator 310 along the arcuate slot 328 (optionally controlled by a servo motor) thus altering an angle of the first solenoid actuator 310 relative to the second solenoid actuator 312. The angle of capture yolk or fork shape can be set based on speed in a collision. For example, if the collision does not have a safety path of consequence or the collision is determined to be sufficient minor, the angle is set to "give way" under pressure of the collision to cause a determined amount of release drag for safest separation of the body from the platform. In the situation when the there is a safety path, the angle changed by control of the safety control module to direct it to fully release and provide that release in the determined exiting direction for the body. With these and related embodiments, the safety control module (not shown) can be programmed to effect a desired directional force onto the body via the platform immediately prior to, or at the time of, release. Once a desired direction is achieved, the pin 326 of the second solenoid actuator 312 is prompted to retract from engagement with the capture arm 322, thus releasing the body from connection to the platform at a region of the first and second solenoid actuators 310, 312. Optionally, additional ones of the mechanical connection unit 300 of FIG. 9 can be provided at other regions of the AV, for example at or near other wheels of the platform.

Figure 10A:
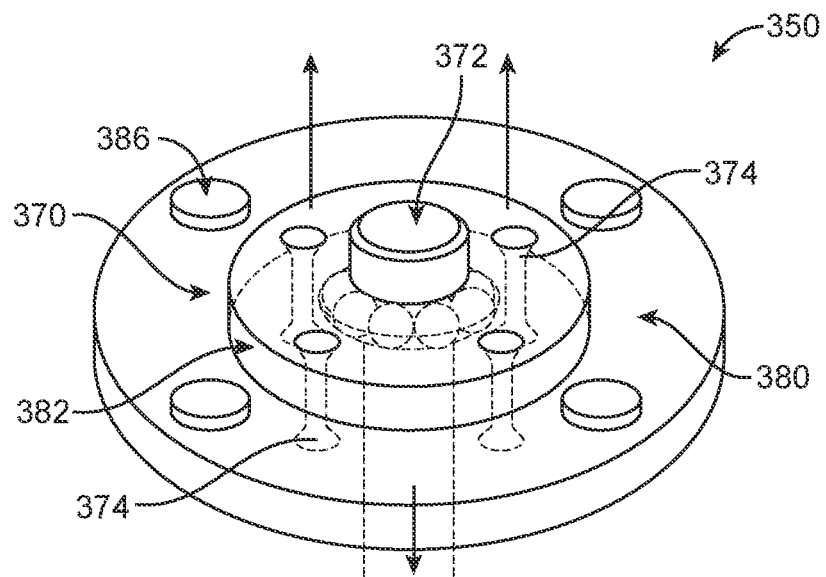
FIG. 10A is a simplified perspective view of a mechanical connection unit in accordance with principles of the present disclosure.
Figure 10B:
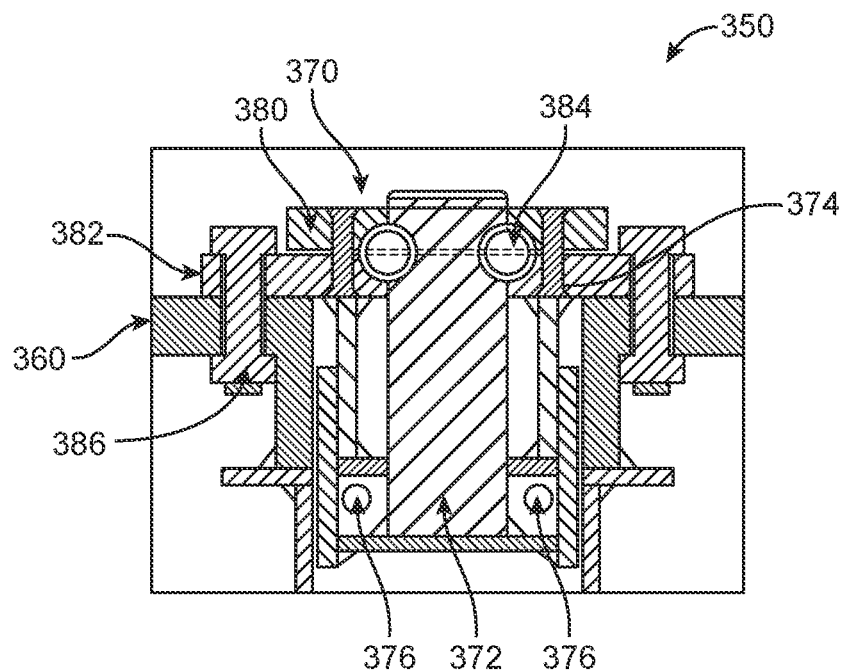
FIG. 10B is a cross-sectional view of a portion of the mechanical connection unit of FIG. 10A.

FIGS. 10A and 10B illustrate portions of another mechanical connection unit 350 useful with the release sub-systems of the present disclosure as assembled to a platform 360. The mechanical connection unit 350 includes a ball bearing assembly 370, a post 372, one or more breakaway explosive charges 374, and one or more ignition assemblies 376. The ball bearing assembly 370 includes a lower housing section 380, an upper housing section 382, and ball bearings 384. The lower housing section 380 is secured to the platform 360 by fasteners 386. The upper housing section 382 is free of direct attachment to the platform 360, and is secured relative to the lower housing section 380 by the explosive charges 374. In some embodiments, the upper housing section 382 is mounted to the body (not shown) of the AV; in other embodiments, the upper housing section 382 can be formed by, or provided as a surface feature of, the body. Regardless, the ball bearings 384 are captured between the housing sections 380, 382, and rotate about the post 372. The ball bearing 384 are not used for rotational friction reduction, but to act as a spreading influence upon the mechanical separation method under active compression. Finally, the ignition assembly or assemblies 376 are configured to selectively power or ignite one or more of the explosive charges 374. In some embodiments, a single ignition assembly 376 is operable to activate or ignite two or more or all of the explosive charges 374; in other embodiments, respective ones of the ignition assemblies 376 are dedicated to a corresponding one of the explosive charges 374. Regardless, the ignition assemblies 374 are communicatively coupled or linked to a safety control module as described above. With this arrangement, the safety control module can remotely prompt actuation of the ignition assemblies 376.

During normal operation of the AV, the mechanical connection unit 350 provides a robust connection between the platform and body as reflected by the state of FIGS. 10A and 10B. When the safety control module determines that the body should be released from the platform, appropriate signals are sent to the ignition assemblies 376. Once prompted, the ignition assemblies 376 actuate the corresponding explosive charges 374, causing the upper housing section 380 (and thus the body) to separate from the lower housing section 382 (and thus the platform) as reflected by arrows in FIG. 10A. Optionally, additional ones of the mechanical connection unit 350 of FIGS. 10A and 10B can be provided at other regions of the AV.

The mechanical connection units described above are but a few examples of the present disclosure. There are many potential mechanical methods to automatically effect separation of the platform from the body. In yet other embodiments, a mechanical backup is employed using compression of one or more bumpers of the AV to determine if the platform and body should, or should not, remain connected. In other embodiments, the attachment mechanism can be a turning screw flight where disconnect is made by a rotating motor upon the threaded coupling. In this variation, the AV suspension is located in the wheel-to-platform attachment.

In yet other embodiments, the mechanical connection units of the present disclosure can employ springs or similar devices to cause faster extraction and/or direction of the body relative to the platform. Cables can optionally be included to restrict a length of a safety path of a released body relative to the platform. In yet other embodiments, the mechanical connection units are configured to provide hinging feature upon separation. This may be done along one end or side along the perimeter of the AV. Release may be done only at the front or only at the back of the AV to better assure that the body can only go in the intended safest direction; this can be provided, for example, by hinging devices in one or more of the mechanical connection units. Similarly, the mechanical connection units may be rotational and in sequence to move from a fully captured or connected state to an open or released state as safety resolve of a particular situation dictates. In yet other embodiments, one or more of the mechanical connection units can be configured to provide a drag surface with the body upon release. The catch/release points can intentionally release with drag on the ejected body to slow rate. This can occur differently at various ones of the mechanical connection units to also steer the body before, during or after release. Regardless of the mechanical connection/release method of the mechanical connection unit, one or more of these unit are controlled by the safety control module decision making based on status monitoring and safety choice decision.

With embodiments incorporating two or more of the mechanical connection units, sequential actuation or release at the mechanical connection units can cause the body to proceed in a desired safety direction path. The sequential release can divert the energy on collision by twisting around one or more non-released mechanical connection units. The platform can be used as a diversionary push to move an obstruction to avoid a direct hit or cause a less-than-direct hit on the body. Algorithms operated upon by the safety control module can consider a glancing blow to direct the released body or the entire AV to a safer conclusion. Other algorithm options include consideration for a longer distance for increased area for release of energy by friction. A sequential release of energy by various friction types may be determined to provide the safest outcome. Multiple contact and surfaces may provide the safest directivity and improve safety outcomes. The timing of actuation of the mechanical connection units can be selected, in some embodiments, to provide a direction that uses the reduction of inertia on the catch point. By doing so it affects the amount of glancing upon other vehicles, vegetation, ground, buildings and other surfaces until the body comes to the safest stop.

The catch points of the mechanical connection units can vary or be standardized between AV designs. A standardized format can permit an AV manufacturer to change suppliers of either major component to replace the original or use others for further body or platform desires. This includes changing the AV's end-use application. The mechanical connection unit locations and types can become standards so the owner has more options for supplier-provided changes for aesthetics, body purposes, or cost advantages. They may become standardized so vehicle charging is done by swapping the platform. They may become standardized so the owner can upgrade to a more efficient or faster charge battery. Regardless, the points of connection of the present disclosure can serve to better direct the body in the case of an emergency The algorithms operated by the safety control module may change over time to fit the parameters of a future body or platform type.

For example, the connections provided by the mechanical connection units can be spread out uniformly to the inside of the shaped passenger body based on aesthetic design desires to help control the sequence of detachment and to provide sufficient hold in cases where the safest passenger condition is determined to retain the connection in one, some or all connection locations. In some instances, the safest method of hold is from the center of the AV or from a mechanical release so that the retention is centric. This may change based on the center of gravity of the particular body or the changing load within the body. The algorithms operated by the safety control module can effect a change in actuation of the mechanical connection units based on a combination of a user's selection of a particular body or a particular platform.

In other embodiments, the one or more of the mechanical connection units are associated with encasements of the wheels of the AV. Since in many AV designs the platform is configured to lower the center of gravity, the wheels and motors are then higher than the platform (otherwise composed partially of the battery). This arrangement of the mechanical connection units can capture the body at the sides thereof and thus channel the capture. This in turn means the mechanics can be sufficient only fore and aft of the AV. Direction of the exit of the body is then determined by the last setting of the platform angle before collision. This angle can optionally be adjusted by the AV operational controller, the contact glancing determination, or the AV tire contact to the body speed and direction (in the case of the lowering of the body or raising of the wheels in that optional safety process).

In yet other embodiments, the mechanical connection unit(s) provided with the AV can be configured to be caused to release the body from the corresponding platform by the impact of a collision under circumstances where the safety control module is unable to affect a controlled release (e.g., data necessary for the safety control module to decide that release of the body from the platform should be done is unavailable). This is typical to the safety design of current vehicles that use crumple zones and/or airbags to reduce the impact upon passengers. With these and similar embodiments, the safety systems of the present disclosure can be configured or programmed to institute default settings when the control sub-system is not on or is unavailable. For example, the mechanical connection units can be set to default retain or release when the AV is parked or stopped and unable to implement a predetermined safest solution path when hit by another vehicle. In another example, the status of the mechanical connection units may or may not change based upon the last known status of location data or whether the body contains passengers.

As mentioned above, some of the release sub-systems of the present disclosure include electrical connection units (components, devices or mechanisms) that effect disconnection of wiring running between the AV body and platform. It is presumed that some if not all AVs with two major components (platform and body) will have electrical connections between the platform and the body. These wires may provide control or power to such items as doors, seats, wipers, lights, audio, HVAC, Internet, sensors and the like. The wires providing power may only be used to provide backup or charging power to the body with its own batteries. Regardless, the wires from platform to body can incorporate disconnects so the separation of the body from the platform for safety release is unimpeded. In some embodiments, the wires will sever or disconnect under the force of the physical separation of the body from the platform. Such a plug friction will not be enough to be of concern as the masses separate and will tear away relatively unaffected. Wire cutting devices, powered devices (e.g., solenoids) can be included to better ensure complete wire separation. In yet other embodiments, the wires are structured to be part of the safety release process to help slow, direct or limit motion of the body relative to the platform. At certain speeds and conditions in a collision, the wires may be best left in place.

In some embodiments, power storage can be located on the AV body. After separation of the body from the platform, power remains to operate body-borne devices such as computers. This includes wireless for body component locating and status signals. It can also implement additional safety features after separation. For example, an external airbag can be provided with the body and actuated after separation. Various actions to improve exit or floating should the body come to rest in water can be provided. Powered fire protection devices can be provided with the body. If the body is powered or charged separately from the platform, then all other wiring can reside in the platform and no connection wires between the two major components of the AV are needed. Coordination between the two may be wireless.

Figure 11A:
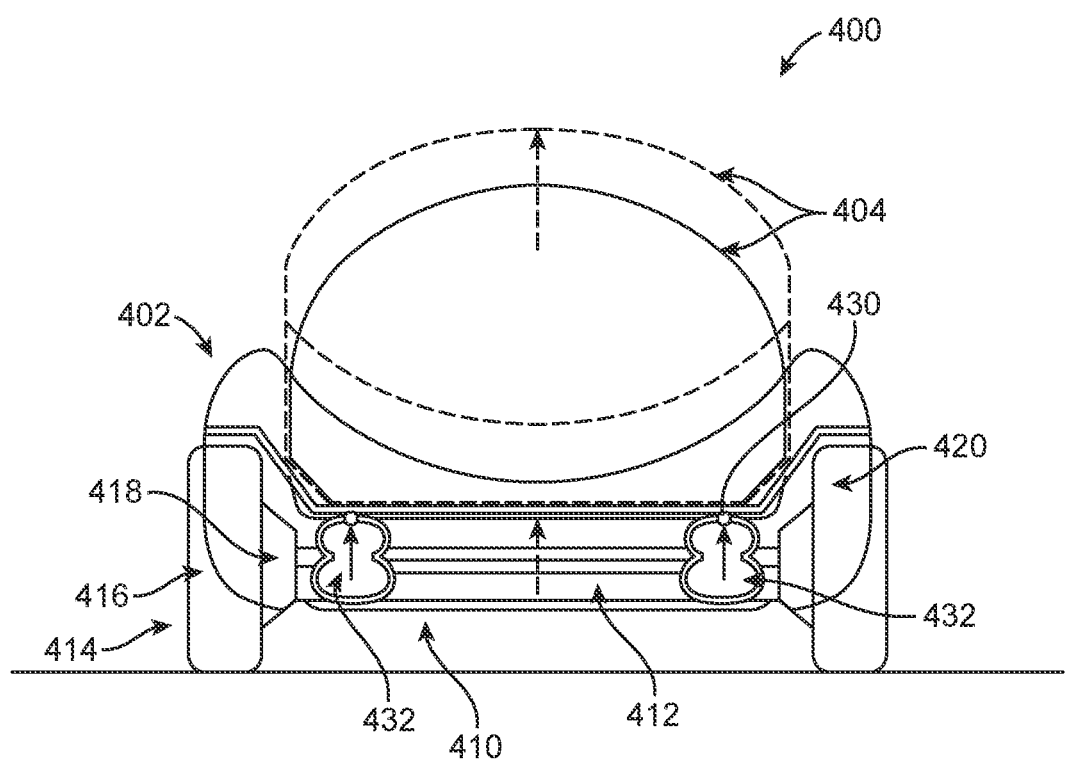
FIG. 11A is a simplified end view of an AV in accordance with principles of the present disclosure and illustrating optional body extension features.
Figure 11B:
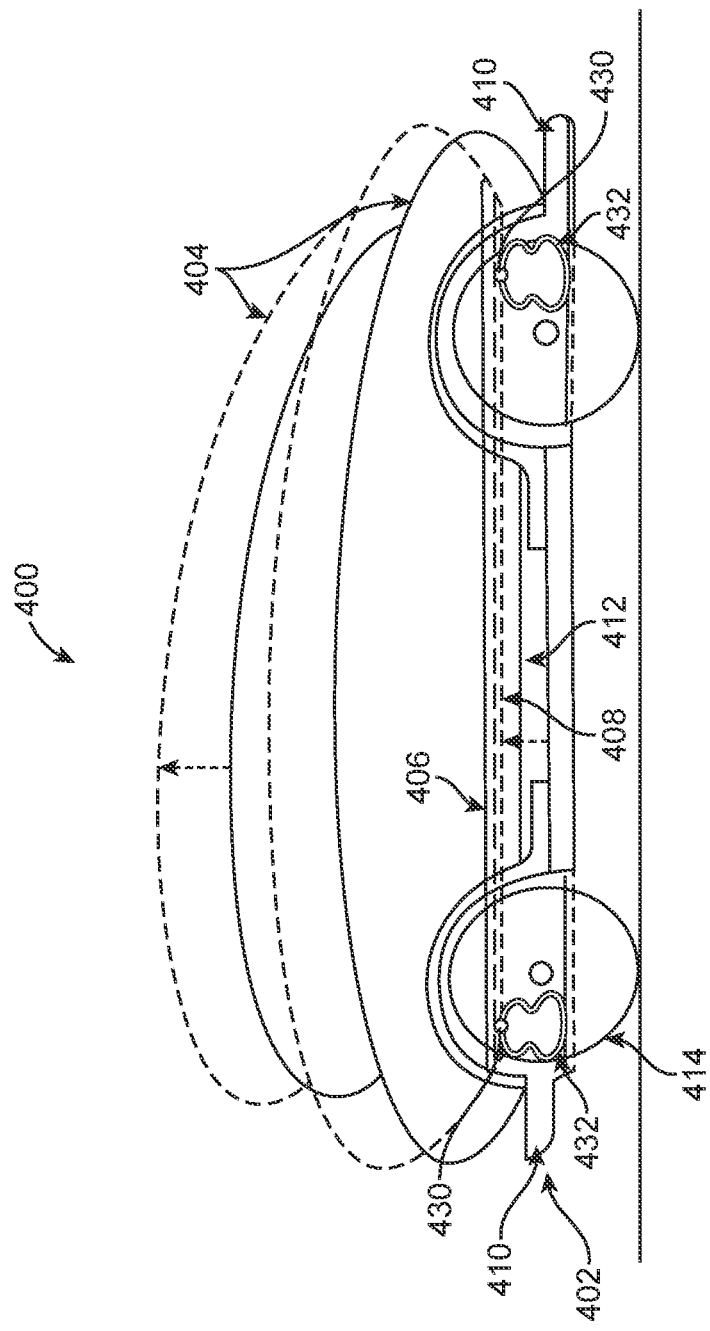
FIG. 11B is a simplified side view of the AV of FIG. 11A.

The release sub-systems of the present disclosure can optionally be configured to address possible irregularities in the body/platform interface. For example, FIGS. 11A and 11B illustrate portions of another AV 400 in accordance with principles of the present disclosure. The AV 400 includes a platform 402 and a body 404 that can generally assume any of the formats of the present disclosure. An optional skid plate 406, 408 (e.g., UHMW sheet) can be carried by one or both of the platform 402 and/or the body 404 for reasons described above. With the non-limiting example of FIGS. 11A and 11B, the platform 402 includes a base 410, a power unit (e.g., battery) 412, and wheel assemblies 414. As with other embodiments, the power unit 412 and wheel assemblies 414 are connected to or carried by the base 410. Further, the wheel assemblies 414 can each include a wheel 416 and an optional motor 418 (labeled for one of the wheel assemblies 414 in FIG. 11A). Regardless, the platform 402 forms or defines front and rear castings 420 (one of which is labeled in FIG. 11A), for example as features of the base 410. With this construction, the body 404 and castings 420 have complementary geometries such that in a normal operational state of the AV 400, the body 404 nests within or inside of the castings 420. As a point of reference, a position of the body 404 in the normal operational state is shown with solid lines in FIGS. 11A and 11B. The castings 420 thus represent an irregularity in the platform 402/body 404 interface.

A release sub-assembly of the AV 400 includes one or more mechanical connection units 430 (several of which are generally identified in the views) that attach the body 404 to the platform 402 during normal operation of the AV 400, and are operable to disconnect or release the body 404 from the platform 402 (at the corresponding point of connection) as described above. The mechanical connection units 430 can have any of the forms of the present disclosure. In addition, the release sub-assembly includes one or more extension units 432. The extension units 432 can assume various forms appropriate for lifting or raising the body 404 relative to the platform 402 when actuated by the safety control module (not shown) of the AV 400. In some embodiments, the extension unit 432 is or includes an air bag (e.g., provided as part of an air ride system of the AV 400). A actuator for filling the air bag (or other activating other formats of the extension unit 432 is electronically connected to the safety control module such that the safety control module can prompt filling of the air bag (or otherwise prompt operation of the extension unit 432) in a controlled or sequential manner relative to operation of the mechanical connection unit(s) 430. In particular, to effect release of the body 404 from the platform 402 and then movement of the body 404 away from the platform 402 (or vice-versa), the safety control module prompts operation of the mechanical connection units 430 to disconnect the body 404 from the platform 402, followed by prompted operation of the extension unit(s) 432 to raise the body 404 relative to the platform 402 (represented by dashed arrows in FIGS. 11A and 11B). A released and raised position of the body 404 is shown with dashed lines in FIGS. 11A and 11B; in the released and raised position, the body 40 is "clear" of the castings 420 (or other irregularity), and is readily able to follow a selected exit path independent of the platform 402.

Body Ejection

Returning to FIGS. 5A and 5B, in some embodiments, the safety control module 170 is programmed to consider and effect a safety path for the body 142 upon release from the platform 140 based upon expected or determined, naturally-occurring forces acting on the body 142 (e.g., a speed and direction of the AV 130 immediately prior to release of the body 142 from the platform 140, braking of the platform 140 immediately prior to or at the time of release, anticipated collision forces placed upon the body 142 at the instant of release, etc.). In this regard, the safety control module 170 can consider and effect a change in speed and/or direction of the AV 130 using existing or standard operational controls (e.g., speed, steering, braking, etc.). In other embodiments, the AV 130 can be configured to provide the safety control module 170 with control over a polarity of one or more of the motors otherwise powering one or more of the wheels. As a point of reference, polarity of the electric-type motors commonly employed with AVs can easily/quickly easily be reversed. Thus, with these and related embodiments, the safety control module 170 can consider a possible safety path for the body 142 that is accomplished by reversing polarity of one or more of the wheel motors (and thus a change in rotational direction of the corresponding wheel) prior to or at the time of release (e.g., reversing polarity can change forces being applied to the body 142 at the time of release, can remove the platform 140 from a path of the body 142 upon release, etc.). When such a safety path is selected, the safety control module 170 is operable to effect control over the corresponding motor(s) accordingly. The use of the motor or motors driving one or more wheels may be reversed by a change polarity to the motor to lessen impact. It may be used in some wheels but not others to help steer the AV away from the unavoidable impact. It may be used to start the change in body inertia separate from the platform and away or diverted from the otherwise unavoidable collision or as continued on by the platform.

Figure 12:
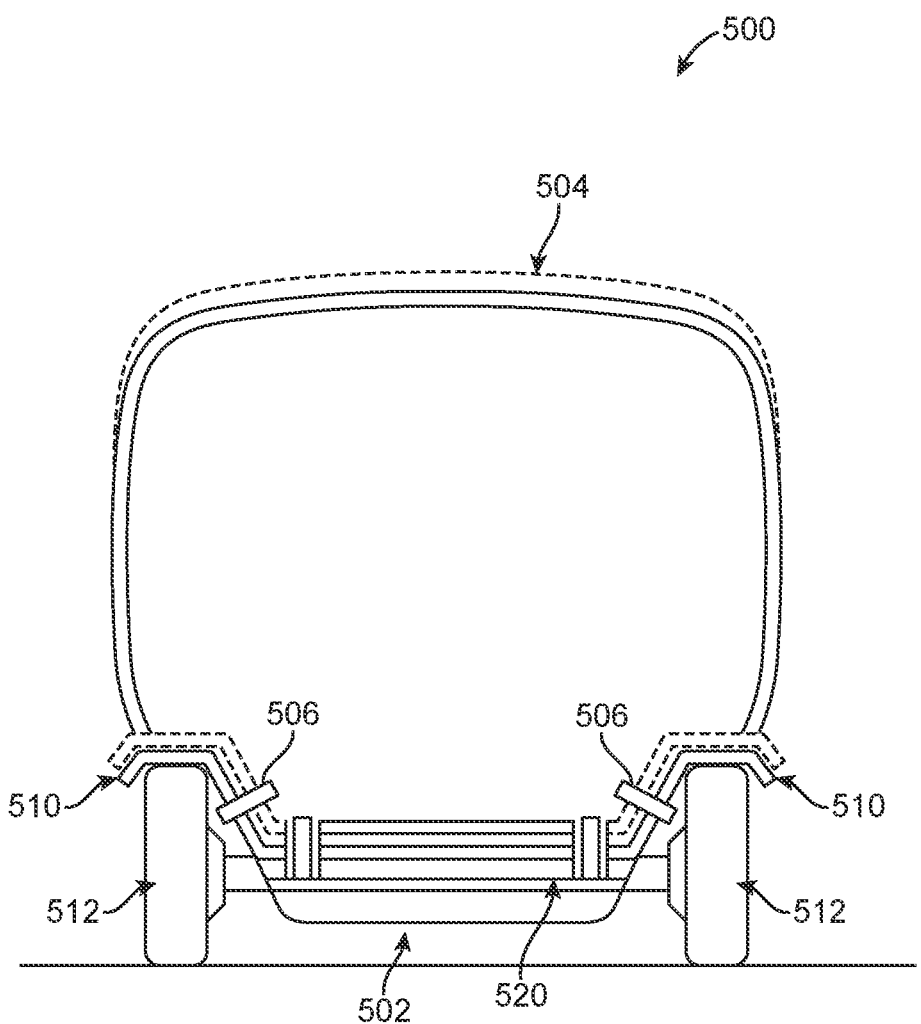
FIG. 12 is a simplified cross-sectional view of a portion of an AV in accordance with principles of the present disclosure and illustrating optional wheel-caused escape features.

In yet other embodiments, the safety control module 170 is programmed to consider and effect a safety path for the body 142 upon release from the platform 140 based upon force(s) generated by one or more wheels of the platform 140 onto the body 142 at the time of release. For example, FIG. 12 illustrate portions of another AV 500 in accordance with principles of the present disclosure. The AV 500 includes a platform 502 and a body 504 that can assume any of the formats of the present disclosure. One or more mechanical connection units 506 (several of which a labeled in FIG. 12) attach the body 504 to the platform 502 during normal operation of the AV 500, and are operable to disconnect or release the body 504 from the platform 502 (at the corresponding point of connection) as described above.

The AV 500 includes or incorporates one or more features that facilitate lowering or dropping of the body 504 relative to the platform 502, for example when prompted by a safety control module (not shown, but akin to the safety control module 170 (FIG. 5B). As a point of reference, a vertical position of the body 504 relative to the platform 502 under normal operating conditions (e.g., a "drive arrangement" of the body 504 relative to the platform 502) is shown with dashed lines in FIG. 12; solid lines represent the lowered or dropped position (e.g., an "escape arrangement" of the body 504 relative to the platform 502). Downward movement or lowering from the drive arrangement to the escape arrangement is reflected by arrows in the view. The body 504 can include or define pads or fenders 510 that are each vertically aligned with a corresponding one of the wheels 512 provided with the platform 502. In the escape arrangement, the pad 510 comes into contact with the corresponding wheel 512. Under circumstances where the wheel 512 is driven or spinning, then, the wheel 512 exerts a force onto the pad 510, and thus the body 504, via frictional interface. A contact surface of the pads 510 can be formed of a material exhibiting an enhanced co-efficient of friction with a material/surface of the wheels 512 so as to enhance frictional contact at the pad 510/wheel 512 interface. Regardless, contact with the wheels 512 sends the body 504 away from the platform 502. A direction of the applied force can be dictated by the safety control module, for example by, where appropriate, reversing polarity of one or more of the wheel motors as mentioned above. It is noted that in some applications, the action of reversing the motor by switching the polarity is quickly accomplished, applying the traction for the wheels/tires 512 to the road away from a forward collision event to lower the inertia at impact for the AV 500 in general. In the case of a stationary or reversing motion of the AV 500, this use of the motor(s) in advance of the collision works as well. In this embodiment, the contact of the wheel(s)/tire(s) 512 upon the body 504 still works to send the body 504 away from the collision on a safer path for the occupants. In the case of the AV 500 being out of control for some reason, all other external fixed and moving surrounding conditions are considered by the safety control module.

In some embodiments, the AV 500 can incorporate features that reduce frictional interface between the platform 502 and the body 504 at regions other than the pads 510/wheels 512 with the body 504 in the escape arrangement. For example, a low friction body 520 (e.g., ultra-high molecular weight sheet) is carried by one of the platform 502 and/or the body 504. In the escape arrangement, the body 504 readily slides relative to the platform 502 at the low friction body 520, enhancing the effectiveness of directional forces applied by the pad 510/wheel 512 interface.

With optional embodiments in which a wheel-based directional force can be exerted onto the body 504, the AVs of the present disclosure can include various features that promote transitioning of the AV from the drive arrangement to the escape arrangement, with safety control module programmed to prompt operation of these features. For example, mechanisms can be provided that effect raising of the platform relative to the body. In other embodiments, mechanisms can be provided that effect lowering of the body relative to the platform. The lowering-type elevation units can incorporate or include suspension devices otherwise supporting the body relative to the platform, such as an air-ride suspension system.

Figure 13A:
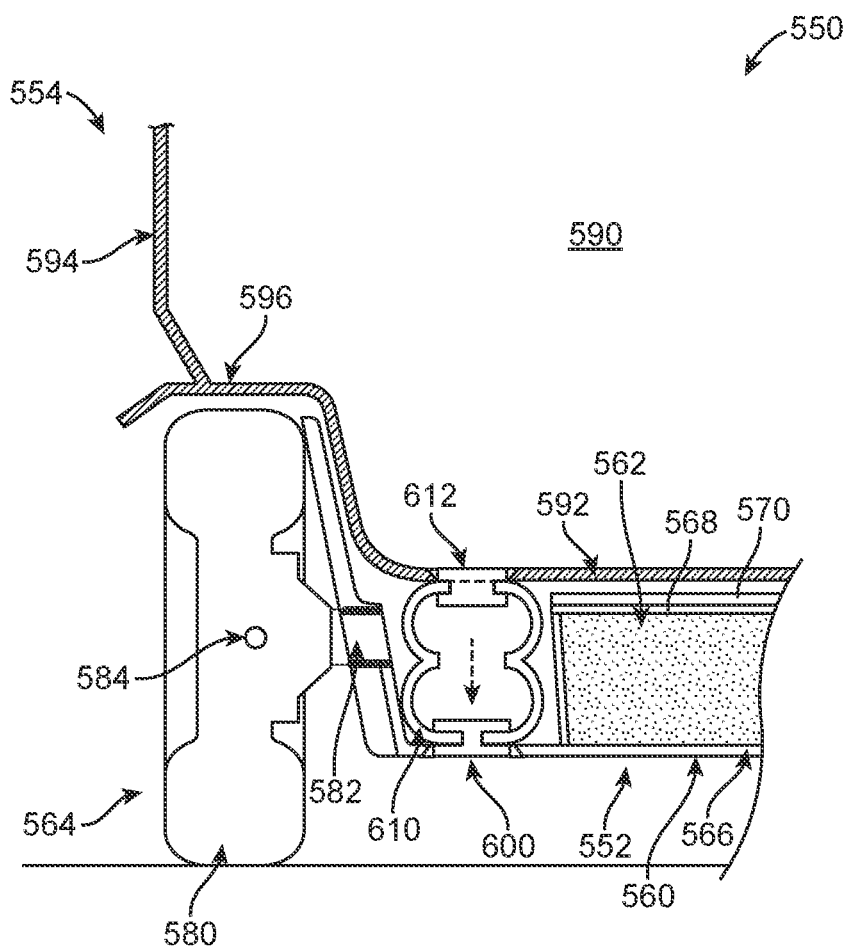
FIG. 13A is a simplified cross-sectional view of a portion of an AV and illustrating an elevation unit in accordance with principles of the present disclosure, including the elevation unit in an operational state.

For example, FIG. 13A illustrates portions of one example of an elevation unit useful with the safety systems of the present disclosure as part of an AV 550. The AV 550 includes a platform 552 and a body 554 that can be akin to any of the platforms and bodies, respectively, of the present disclosure. In some embodiments, the platform 552 includes a housing 560, a power unit (e.g., battery) 562, and wheel assemblies 564 (a portion of one of which is shown in FIG. 13A). The housing 560 defines a base wall 566 and a top wall 568. The top wall 568 can optionally be a low friction plate (UHMW skid plate), or a low friction plate 570 can be assembled over the top wall 568. The power unit 562 is maintained within a compartment of the housing 560. The wheel assembly 564 includes a wheel 580 mounted to an axle 582 that in turn is connected to the housing 560. A motor (identified generally) 584 powers movement or rotation of the wheel 580. Mounting of the wheel 580 can provide for active or passive steering.

The body 554 forms an enclosure zone 590 (referenced generally) at which passengers and/or cargo can reside, such as at least partially by a floor panel 592 and a side panel 594. A pad or fender 596 is formed or carried by the body 554 in a region of each of the wheels 580 (i.e., a single one of the pads 596 is shown in FIG. 13A).

Other constructions for the platform 552 and the body 554 are also acceptable. Regardless, the AV 550 further includes one or more elevation units 600 operable to transition (or permit transitioning) of the body 554 from a drive arrangement (reflected by FIG. 13A) to an escape arrangement (described in greater detail below with respect to FIG. 13B) relative to the platform 552. The elevation unit 600 includes a bag 610 and a release device 612. The bag 610 can be akin to a conventional air bag, expanding when inflated with fluid (e.g., air). A bottom of the bag 610 is fixedly attached or coupled to the base wall 566 of the platform 552. The release device 612 temporarily secures a top of the bag 610 to the body 554, for example to the floor panel 592. The release device 612 is operable to release the bag 610 from the body 554, along with permitting the bag 610 to deflate. For example, in some non-limiting embodiments, the release device 612 is, or is akin to, an inward explosive bolt.

Regardless, an activation mechanism of the release device 612 is electronically connected to the safety control module (not shown) such that the safety control module can prompt operation of the release device 612.

Figure 13B:
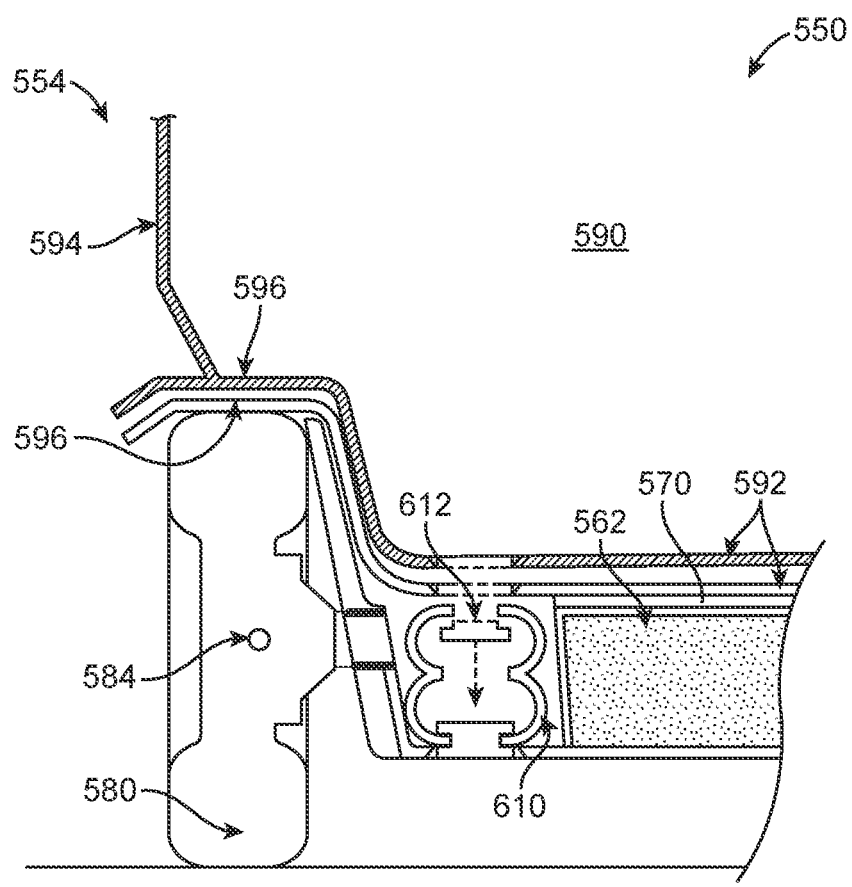
FIG. 13B is the AV of FIG. 13A and illustrating the elevation unit in a lowered state.

During standard operation of the AV 550, the bag 610 is attached to the body 554 and filled with an inflation medium (e.g., air). In a normal or inflated state (as in FIG. 13A), the bag 610 maintains the body 554 away from the platform 552 by a distance sufficient to permit unimpeded rotation of the wheel 580 (e.g., the drive arrangement of the body 554). Depending upon construction and inflation conditions, the bag 610 can further serve as a suspension or spring, isolating the body 554 from bumps or other forces experienced by the platform 552 as the wheels 580 travel over various terrain. As reflected by FIG. 13B, when prompted by the safety control module (not shown), the release device 612 operates to release the bag 610 from the body 554, and the inflation medium to exit or exhaust from an interior of the bag 610. FIG. 13B reflects the release device 612 as being or including an inwardly exploding bolt, with an arrow showing movement of the release device 612 away from the floor panel 592. As the bag 610 deflates, the body 554 transitions to the escape arrangement under the force of gravity. As a point of reference, in the view of FIG. 13B, an arrangement of the body 554 prior to deflation of the bag 610 is shown with cross-hatching. In the escape arrangement, the pad 596 contacts the wheel 580, with the wheel 580 then applying a force onto the body 554 at the wheel 580/pad 596 frictional interface as described above. In some embodiments, the bag 610 will, by memory, shrink sufficiently to go below the level of the low friction plate 570 and thus not impede ejection of the body 554 from the platform 552. Further, contact, if any, between the floor panel 592 and the low friction plate 570 does not overtly resist ejection of the body 554 from the platform 552.

Additional, Optional Features

The safety systems and AVs of the present disclosure can include one or more features in addition to the release sub-systems and control sub-systems as described above. For example, one or more features can be provided to effectuate a change in a momentum of the body upon release from the platform. In another example, the body can include wheels or smooth surfaces to assist the body to travel further to spread friction based on stopping over a longer path. In one approach, UHMW or ultra-high molecular weight sheets or surfaces can be incorporated on the body, the platform, or both to help in separation. These surfaces can help the body move along, through exit safety paths that are time-limited openings and to assist in completing the safety control module's determined safety path and stop location. One non-limiting example of a location of the UHMW sheet is shown at 258 in FIG. 7. The use of this or similar material can be used such that the braking of the AV and release of mechanical connection unit(s) is able with or without impact as determined and permitted by safety path decision making, to send the body on the safety path. The low friction material can be useful in the event of a side collision to help the body "pop out" more readily from the impact when some or all of the mechanical connection units are released. In related embodiments, some of the mechanical connection units opposite the hit may be operated to stay intact to act as a hinge to direct motion of the body for improved safety to the passengers (e.g., avoiding a secondary collision).

One or more features can be provided with the body to effectuate increased drag upon release of the body from the platform. For example, with embodiments in which the mechanical connection unit includes a solenoid-actuated pin, the solenoid actuator can be wirelessly prompted after separation to re-extend the pin. The so-extended pin can then help drag the body to a stop (e.g., before coming to a further obstruction). Alternatively or in addition, a mechanical feature typical to a brush, rake, pin, racing car air brake, drag car parachute, chute or flap, etc., can be carried by or provided with the body and caused to deploy thereby spreading out the inertia over time to ease the impact upon passengers after or during the body being fully or partially released. Airbags are optionally included on the inside of the body, the outside of the body, or both.

Figure 14:
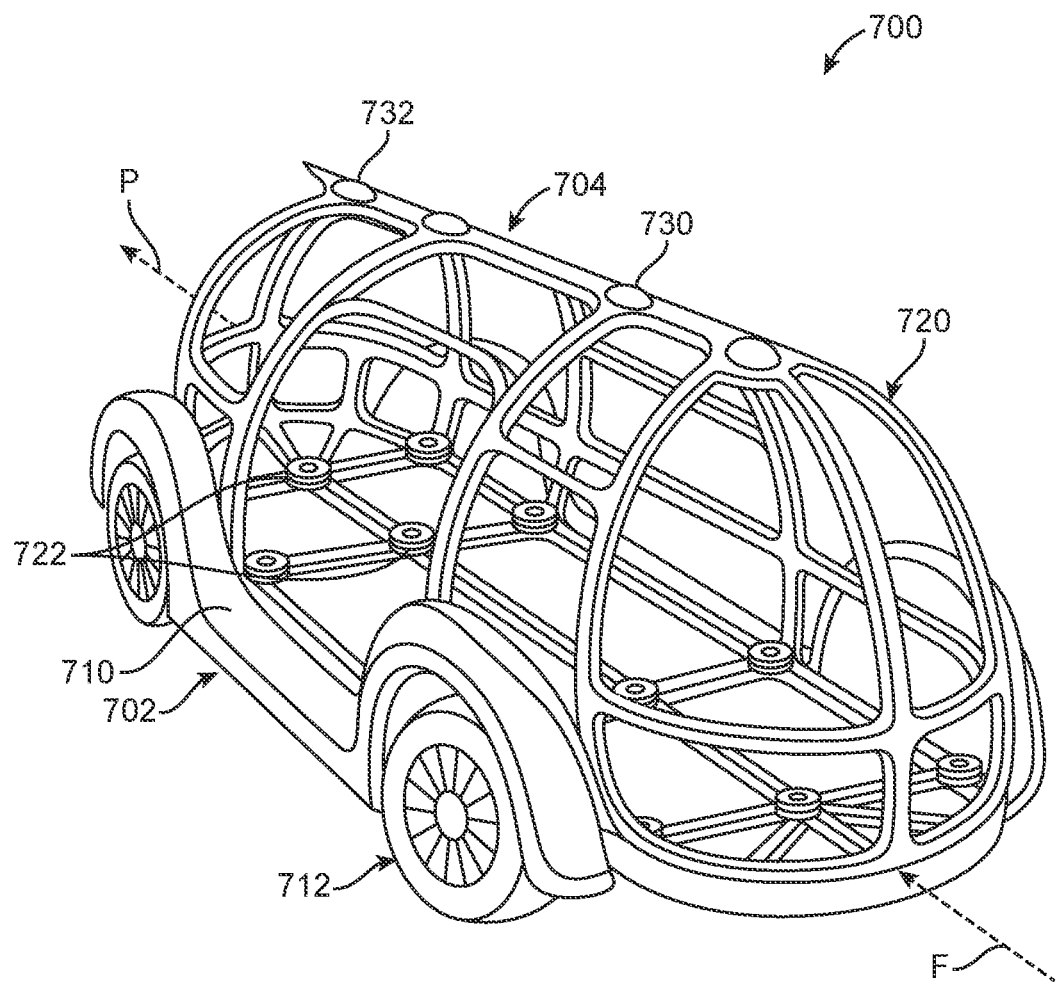
FIG. 14 is a simplified perspective view of an AV in accordance with principles of the present disclosure.

While some of the AVs of the present disclosure have been described as incorporating a conventional or known body construction, in other embodiments the body can have other configurations. For example, the body can include or be formed as a structural cage as reflected by the AV 700 of FIG. 14. The AV 700 includes a platform 702 and a body 704. The platform 702 can assume any of the forms of the present disclosure, and generally includes a base 710, wheels 712, a power unit (not shown), etc. The body 704 includes a structural cage 720 mounted to the platform 702 by mechanical connection units 722. The mechanical connection units 722 can assume any of the formats of the present disclosure, and in some embodiments are akin to the mechanical connection unit 350 of FIGS. 10A and 10B. FIG. 14 further reflects that the AV 700 can include various sensors 730 carried by the cage 720, a wireless connection device 732 (e.g., for Internet connection). The structural cage 720 can be appropriate and longer lasting for travel on an extended safety path and to deflect rather than crush. This may mean the body 704 is not made to absorb impact typical to existing vehicles, but instead to bound or glance away from sudden impacts. Regardless, in some embodiments, the AV 700 further includes a safety sub-system of the present disclosure, including a safety control module (not shown) programmed to determine, for example, that safety path responsive to an imminent collision force (arrow F in FIG. 14) is accomplished by turning the wheels 712 and then prompting the mechanical connection units 722 to release the body 704 from the platform 702, allowing the body 704 to travel away from the platform along safety path P (arrow in FIG. 14) following impact.

In other embodiments, the body can be made with roto-molded plastic forms. The plastic forms can be covered with a layer of material to insulate the body while supporting the improvement of passenger safety. For example, the layer can be composed of honeycomb, floccules or crush shapes either integrated into the rotomolded design or as a separate sandwich or secondary layer. In such designed bodies with captured airspace, the enclosure may be better suited to a warmer, cooler space while providing additional safety for passengers. In other embodiments, the body is made from multiple molds that provide ingress and egress access. For example, the body can be provided as an upper and lower clamshell that, when closed, connects to provide a completed eggshell safety enclosure. In any case, the body enclosure is constructed to improve safety of the passengers during and after collision including the path to conclusion of the inertia movement. Once at rest, the body can automatically release further connections than those to the platform to assist in the exit from the body by the passengers.

With the optional eggshell body configuration, an entire portion can integrate the access section such that the door is also the entire or most of the complete top half of the body. The upper segment can hinge on one side. It can include hinges so passengers can enter standing, and after sitting the door hinges close. In another form, the body may rise typical to or with scissor lifts. Regardless, the optional eggshell configuration is conducive to traveling away from a direct impact (and separated from the platform) to improve passenger safety due to the enclosure body's ability to retain the shell of protection. This can include the ability of the body to survive additional, less severe collisions, rubbing off energy by friction on various surfaces and glancing off of obstructions as pre-planned by the safety control module to affect the best outcome.

As described above with respect to FIG. 5A, in some embodiments, the platforms of the present disclosure can have one or more compression segments along a perimeter thereof. These can be one-time use honeycomb crushing segments. The honeycomb structures on the sides can be used as an access/exit step(s) for the corresponding body. The compression segments can alternatively include or comprise non-honeycomb configurations (e.g., pistons). The compression segments can carry sensors that assist in verifying impact timing or amount. This optional information can be used to help the safety system determine release approval, timing or sequential actions for the controls of the AV.

While some of the safety systems of the present disclosure are configured to consider and react to an imminent or unavoidable collision event, other potentially hazardous scenarios can be addressed. For example, during a collision or just by temperature monitoring alone, the safety control module can be programmed to determine or predict that there has been, or potentially will be, a battery fire or potential ignition. The safety control module can be further programmed such that in these scenarios, the mechanical connection units (and optional electrical disconnect devices) can activate and, if sufficient power remains, the body can be made to leave the platform. The platform may use wheel power to cause the body to separate and distance the body from the platform in the case of fire. This may be ideal regardless of whether passengers are present in the body. For example, this optional feature could be employed after autonomously driving/directing the AV out of a garage to save the house and the body. The safety of others based on data from any source can be part of this safety control algorithm and action implementation plan. If there are no passengers, then the platform can be prompted to drive to a safe spot, remove the body and provide a space for the body that is away from other hazards or people. If there are passengers in the body, then a decision can be made to exit the passengers and then proceed or to release the body with passengers and proceed. The decision can be determined based on timing and surrounding restrictions. Once again, the determination of safest steps can be predetermined and ready for activation should the battery monitoring require safety actions.

Example Algorithms

As made clear by the above descriptions, the safety control modules of the present disclosure can be programmed to determine and effect various safety plans for passengers of an AV, for example by prompting separation of the AV's body from the platform in a determined fashion. The safety control modules may use monitored and collected "zone of influence" statuses to prepare and implement a determined safety plan in a condition of imminent or unavoidable collision, with the safety plan including an escape path for the separated body from the platform to reduce or eliminate passenger harm. The "zone of influence" is the area surrounding the AV that has the potential for causing changes in the safety of the AV's passengers.

The algorithms operated by the safety control modules can utilize, as inputs, one or more of: location(s) of one more fixed objects, velocity and direction (or translation) of external moving objects to determine vectors of each within the zone of influence upon the safety of passengers within the body exiting from the platform, and velocity and direction (or translation) of the AV itself (currently and in the upcoming zone of influence).

The algorithms operated by the safety control modules can generate one or more outputs. For example, available escape path options can be an algorithm output, with these options being based upon determined "openings" or "voids" in the physical surrounding environment that are otherwise available for the separated body to exit or travel at various velocity and translation vectors. The algorithms can continuously determine or predict the safest escape path from the available options, for example based on an assessment of predicted impact and/or estimated likelihood of passenger injury. The algorithms can, if no "best" escape path is available, determine if body-to-platform connection is to be retained, determine if partial body-to-platform connections are to be retained/released and which one to retain/release, and/or determine if body partial collision(s) to fixed or moving objects has the better passenger outcome. The algorithms can optionally generate requested change of vector messages to other AVs in the zone of influence to coordinate a best outcome. The algorithms can optionally activate audio and/or light alarms to alert others in the zone of influence. The algorithms can optionally use separated or partially separated platform vector as a protector of the body or to open a selected safety path. To effect, for example, directing the body along the determined or selected escape path, the algorithms can be adapted to effect one or more of: turning the AV's wheels, adjusting motor speed and direction, applying brakes, implementing tire-to-body contact (e.g., to add or subtract from body momentum, vary tire-to-body speed, vary tire-to-body rotational direction, vary tire-to-body angular direction, apply these variables in a coordinated way to achieve a desired outcome, etc.).

The algorithms can be programmed to receive and review various inputs. For example, information from sensor(s) for determining shape, orientation, and/or temperature of the AV body. Sensors carried by the body can also be utilized to determine impact(s) and inform emergency personnel. GPS event history can be reviewed to determine progress of the released body and concluding location to inform emergency personnel and others in the zone of influence. Existing (historical and current) autonomous sensor data from the AV and other AVs can be reviewed. Existing autonomous decision making to avoid collisions can be reviewed. Existing autonomous decision making otherwise facilitating progress of the AV to a particular end destination. Data from other vehicle sensors can be reviewed, such as historical fixed information, historical moving information within the time of influence, historical less traffic out of the zone of influence, historical moving to fixed within the zone of influence, etc. Emergency vehicle incoming wireless data on the zone of influence can be reviewed, for example monitoring emergency right of way, monitoring emergency control of stop light(s), activation of pull over and stop impact on zone of influence activities, etc. Delivery drone or air taxi data can be reviewed, for example historical data on fixed objects, historical data on moving objects within time frame on influence, etc. Internet images can be interpreted, for example fixed obstacles from camera images generated by cameras at known image capture locations, fixed obstacles from more than one angle image, verification of obstacles by autonomous vehicle sensor data, confirmation of obstacle and location by historical data from AVs, etc. Autonomous vehicle safety drone information can be reviewed, for example use of extended range sensor data from drone paired with the AV, extended range sensor data from a drone dedicated to a fixed area, etc. Images form fixed area cameras can be reviewed, for example use of area monitoring camera images for fixed obstacles, use of area monitoring camera images to establish moving obstacles in the zone of influence, etc. The AV's prior trip data can be reviewed, for example experience-based zone of influence data based on collection of potential safety paths, correction of likely safety paths based on other AV's data and analysis of safety paths, current situational data correction of safety path options, etc. Multiple angle sensor data can be reviewed, for example to determine size of an obstacle, determine distance of an obstacle, determine type of obstacle, etc. Image comparison information can be reviewed, for example identifying a type of obstacle, identifying type of ground surface, identifying uniformity of ground surface, etc. Monitored safety data from other AVs or EVs with sensors, for example to identify vehicles in or out of directional control, identify safety decision making of other vehicles as part of a coordinated safety path, etc. Monitored wireless cooperative data requested by others can be reviewed. Wireless data regarding condition of passengers from passenger mobile devices can be reviewed. Wireless data regarding a purpose of passenger transport can be reviewed. Highway or adjoining construction status from governing bodies or contractors can be reviewed.

The decision-making algorithms for determining a safety path can be based on one or more of the data inputs described in the present disclosure. The algorithms of the present disclosure can determine a safety path based on capabilities of the AV (e.g., a configuration of the release sub-assembly provided with the AV), current conditions and expected conditions at the point of collision. The safety path can further be determined based on whether or not the AV contains passengers and/or if other AVs in the zone of influence contain passengers. The safety path can further be determined based on vector of obstacles within the zone of influence. The algorithms can determine safest timing to begin path activation, safest angle of release, safest speed of release, etc. The algorithms can determine a desired direction of body exit based on the safest outcome (e.g., forward, rearward, side release, partial release, etc.). The algorithms can determine if partial contact of the separated body upon other moving or fixed objects provides an improved outcome for passengers through reduction of inertia or redirection to a safer path.

In some embodiments, the algorithms of the present disclosure use sensor data to find the safest exit path for the AV body when released or extracted from the AV platform to avoid or reduce impact injury on passenger(s) in the AV body that might otherwise result from an imminent collision. Variables or parameters utilized by the algorithms can include:

AVs=Subject AV being controlled by the safety algorithm(s);
B=Body of AVs released from platform of AVs;
P=Platform of AVs after releasing B;
ZOI=Zone of Influence=ongoing area of potential contact with B upon release from P at a given time;
V=Vector (speed and direction) of moving items (e.g., AVs, other AVs, other EVs, other traffic, pedestrians, bikers, animals, etc.) that have a changing potential impact upon B when released from platform of AVs within the ZOI;
Vs=Vector of AVs;
Vx=Vector(s) of other in the ZOI, including incoming and less exiting;
U=Area of possible exit path blocked by stationary items (e.g., buildings, parked vehicles, trees, etc.) in degrees as the ZOI moves with the AVs;
F=Approximation of friction-caused slowing of B upon being released from P (reducing speed over a distance due to type or surface or glancing impact);
Ox=Possible exit paths or openings for B (e.g., speed, degrees, and time window for B upon release from P) based on, for example, U and Vx as compared with Vs;
C=Available control of AVs and resulting influence on B before release from P;
I=Amount of impact on B;
Sx=Acceptable stop locations for B following release from P (e.g., least impact by others and terrestrial considerations);
S=Safest exit path for B based on best I reduction or elimination selected from determined Ox's (degrees and time).

From the above, an example algorithm can be, or can be based upon:

S=Sx with lowest I based on comparison of Ox solution outcomes using ZOI status (implementing fixed and moving data analysis) and applying analysis of F using surface type and conditions for travel of B after application of selected C and instructions to Vs being acknowledged and assuming changes of the vectors of the so-instructed vehicles based on forthcoming implementations.

In another non-limiting example, the safety system establishes prior to proceeding the vector paths (Vx) for B (if released from P) in 45-degree increments (or some smaller increment) over the 360-degree range. To consider or determine which of these possible or available vector paths Vx should be selected or implemented as the safety path in the event of unavoidable collision (or other circumstances), algorithms can include:

For each vector path Vx, review available data and determine if there are stationary U in the way. If yes, dismiss.
For each remaining vector path Vx, during progress of Vs sensors, consider if there is a greater than 50% likelihood a moving obstacle will be in the way? If yes, dismiss.
For each remaining vector path Vx, consider if there a greater than 75% likelihood the AV can be operated to achieve? If no, dismiss.
For remaining vector paths Vx, select and use as S the vector path VX that is "closest" to current Vector of the AVs.
If no safe vector paths Vx remain, apply all C options to reduce impact including angle of vector.
At speeds below 5 MPH, retain connectors. At speeds above 5 MPH, release B to contact tires with motors in polarity away from impact direction to lower B inertia to reduce or avoid B impact for purposes of improving passenger likelihood of safer outcome.

Another non-limiting example of a scenario illustrating implementation of the safety systems and algorithms of the present disclosure includes a family of five beginning a trip in their AV. As the family loads into the AV, the driver informs his smart phone of their intended destination. The AV is thus notified of the event and the onboard computer checks the AV control center with the trip intention. There are some weather, road and traffic warnings at various parts of the trip based on other AV traffic results and their sensor input. The safety path restrictions limited by fixed objects along both sides of the trip are input into the onboard computer. The option backup of this decision-making could have coming from the control center computer wirelessly real-time, but the new onboard computing capacity and speeds of processing of the new family AV can handle this ongoing safety planning preparation and implementation task.

The AV's standard sensors and controls perform as expected to take the family to the destination. Along the way, the AV is trafficking on a long, curved portion of the highway. A deer bolts from the woods ahead, causing another AV to divert off line. The road has some less-than-ideal surface conditions form the frost of the morning. The AV has additional high roof sensors to cover the zone of influence. The input data is included into the prepared body exit planning just in case of a safety escape requirement. The latest Google images for the trip have been pre-analyzed for obstructions. The sensor data form previous trips by this AV and other AVs have been included in the input.

The out-of-control vehicle communicates wireless to others in the zone of influence, including the family's AV. Little time remains and a collision is determined to be imminent and unavoidable. The preplanned safety has already computed an exit strategy and based on coordination with two other AVs and the out-of-control AV, exit limitations of existing structures and trees, and other input implements a safety decision is at the ready. The best outcome has been made by the safety determination algorithm. The safety path for the body of the AV has been pre-set and is quickly implemented. The wheels are turned in the opposite direction of those in the oncoming AV. The brakes are applied. The airbag air-ride supporting the body and holding it in place use explosive bolts to separate the AV's body from the platform. The bolts are ignited and the air in the bag rushes out. The electrical connections between the body and the platform are pulled away. The body of the AV drops onto the UHMW skid plates in order to exit at low friction. The tires meet the body as it drops. The motors' speed and direction send the body away from the collision. The platform collides at a glancing angle to protect the sent body and the passengers in the other vehicle who are also on their own safety path exit.

The released body (with the family still on board) now has less energy because the weight and inertia of the platform are gone, and slides along a path that misses other vehicles and fixed obstructions as planned. The drag of the body on the ground has dissipated the body energy and it comes to rest in an adjoining field. All five passengers are unhurt, as are the passengers in the other vehicle. Other AVs in the zone of influence have avoided a collision event. Even the deer is fine. The event is reported and emergency staff, replacement AVs and tow vehicles are on their way. The body and platform of the AV can later be re-assembled to one another with new explosive bolts and the crush segments replaced.

The AVs, safety systems, and safety control modules of the present disclosure provide a marked improvement over previous designs. Regardless of the body and platform shape, materials and design safety options of the safety system of the present disclosure perform safety measures using preplanning based on monitoring of the changing surrounding physical fixed status and moving situation analysis to determine if, when, and how the body should be released from the platform under circumstances of an imminent or unavoidable collision event. The safety control module can determine how many, where and what connection points between the body and platform should be released and the timing of such release operations. The safety control module can determine the direction of and timing of a safety path for the body. This determination can use the impact, the speed change of the platform based upon the AV's speed, brakes, steering, body-to-wheel contact, or a combination of all or some of these external or internal change forces. For example, speed changes of the platform in timing with the mechanical connection unit release can cause the intentional release of the body to safety. The safety systems of the present disclosure can sacrifice the platform to improve a safety outcome for the body by helping absorb the unavoidable collision mass from hitting the body or partially do so.

It is considered in the present disclosure that the safety path decision-making control described with respect to the safety control modules (e.g., the safety control module 170 of FIG. 5B) may be performed by the AV processing unit otherwise providing for autonomous travel. The safety processing may be an integrated segment of code assigned to act typical to the safety control modules described herein and acting upon mechanical features as described above to separate and send the body apart from the platform on the predetermined safety path.

Although the present disclosure has been described with reference to preferred embodiments, workers skilled in the art will recognize that changes can be made in form and detail without departing from the spirit and scope of the present disclosure.

The invention claimed is:

1. An autonomous electronic vehicle (AV) comprising:
a platform comprising a battery and wheels;
a body defining a passenger enclosure;
a mechanical connection unit connecting the body with the platform, wherein the mechanical connection unit is configured to transition between a first state in which the body is attached to the platform at the mechanical connection unit and a second state in which the body is released from the platform at the mechanical connection unit;
at least one sensor carried by one of the platform and the body;
a safety control module in communication with the at least one sensor and programmed to perform one of a plurality of available actions responsive to a potential collision event, wherein at least one of the plurality of available actions includes:
determining a safety path for the body away from the platform from a plurality of available travel paths,
arranging at least one of the wheels to correspond with the determined safety path,
prompting transition of the mechanical connection unit from the first state to the second state to release the body from the platform, followed by the released body contacting the at least one wheel such that contact with the at least one wheel sends the released body away from the platform along the determined safety path.

2. The AV vehicle of claim 1, further comprising an operational controller programmed to autonomously operate the AV based on data from the at least one sensor.

3. The AV of claim 1, wherein the safety control module is programmed to determine the safety path for the body apart from the platform in response to the determination of the potential collision event, wherein the determined safety path is selected from the plurality of available paths and further wherein a portion of at least one of the available paths includes the body being entirely disconnected from, and not in contact with, the platform.

4. The AV of claim 3, wherein the safety control module is programmed to determine the safety path based upon information provided by at least one of internet-available maps and image data.

5. The AV of claim 3, wherein the safety control module is programmed to determine the safety path based upon information provided by at least one other AV in wireless communication with the safety control module.

6. The AV of claim 3, wherein the safety control module is programmed to continuously determine the safety path.

7. The AV of claim 3, further comprising a steering mechanism operatively coupled to at least one of the wheels, and further wherein the safety control module is programmed to prompt operation of the steering mechanism and the mechanical connection units in a cooperative fashion to direct the body apart from the platform and along the determined safety path.

8. The AV of claim 3, wherein the safety control module is programmed to determine the safety path as being free of at least one of fixed obstacles, moving obstacles, and hazardous terrain.

9. The AV of claim 3, wherein the safety control module is programmed to consider surfaces for slowing down the body by friction in determining the safety path.

10. The AV of claim 3, wherein the safety control module is programmed to estimate and compare severity of injury for a plurality of possible paths in determining the safety path.

11. The AV of claim 3, wherein the safety path for the body is one of forward and backward relative to a current travel direction of the platform.

12. The AV of claim 1, wherein the AV includes a plurality of mechanical connection units, and further wherein the safety control module is programmed to sequentially transition each of the plurality of mechanical connection units from the first state to the second state.

13. The AV of claim 12, wherein the safety control module is programmed to operate the mechanical connection units to effect a travel path of the body away from the platform that is non-linear with respect to a current direction of travel of the platform.

14. The AV of claim 1, wherein the mechanical connection unit includes at least one explosive bolt.

15. The AV of claim 1, wherein the mechanical connection unit includes at least one solenoid actuator.

16. The AV of claim 1, further comprising an elevation unit operable to selectively permit contact between the body and at least one of the wheels, and further wherein at least one of the plurality of available actions includes:
    prompting transition of the mechanical connection unit from the first state to the second state to release the body from the platform; and
    following prompted transition of the mechanical connection unit, prompting operation of the elevation unit to transition the body relative to the platform from a drive arrangement to an escape arrangement in which the released body contacts at least one of the wheels.

17. The AV of claim 1, wherein the safety control module is further in communication with an air ride system of the AV and is programmed to prompt operation of the air ride system in concert with the mechanical connection unit.

18. The AV of claim 1, wherein another at least one of the plurality of available actions includes causing the body to move along the determined safety path away from the platform by:
    prompting at least one of the wheels to turn to a selected orientation relative to ground;
    prompting transition of the mechanical connection unit from the first state to the second state to fully release the body from the platform; and
    following release of the body, causing the released body to contact the at least one wheel turned to the selected orientation such that the released body is driven in a direction of the selected orientation.

19. The AV of claim 1, wherein the platform includes an electric wheel motor driving at least one of the wheels, and further wherein another at least one of the plurality of available actions includes:
    prompting a change in polarity of the electric wheel motor; and
    following the change in polarity, prompting transition of the mechanical connection unit from the first state to the second state to release the body from the platform.

* * * * *